United States Patent
Jayaram et al.

(10) Patent No.: US 12,498,490 B2
(45) Date of Patent: Dec. 16, 2025

(54) SATELLITE-BASED OPERATION OF A MOBILE DEVICE

(71) Applicant: QUALCOMM Incorporated, San Diego, CA (US)

(72) Inventors: Chandrasekhar Jayaram, Bangalore (IN); Bo Zheng, Sunnyvale, CA (US); Simran Deepak Makariye, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/322,435

(22) Filed: May 23, 2023

(65) Prior Publication Data

US 2024/0393470 A1 Nov. 28, 2024

(51) Int. Cl.
*G01S 19/08* (2010.01)
*G01S 19/07* (2010.01)
*H04W 64/00* (2009.01)
*H04W 72/0453* (2023.01)

(52) U.S. Cl.
CPC ............ *G01S 19/08* (2013.01); *G01S 19/074* (2019.08); *H04W 64/003* (2013.01); *H04W 72/0453* (2013.01)

(58) Field of Classification Search
CPC .......... G01S 19/00; G01S 19/01; G01S 19/08; G01S 19/074; G01S 19/11; G01S 19/28; G01S 19/32; H04W 72/044; H04W 72/0453; H04W 64/00; H04W 64/003
See application file for complete search history.

(56) References Cited

U.S. PATENT DOCUMENTS

| | | | |
|---|---|---|---|
| 10,732,291 B2 | 8/2020 | Capet et al. | |
| 11,378,697 B2 | 7/2022 | Cookman et al. | |
| 11,520,056 B2 | 12/2022 | Schnaufer et al. | |
| 11,525,926 B2 | 12/2022 | Knutson et al. | |
| 2018/0180742 A1* | 6/2018 | Capet | G01S 19/22 |
| 2020/0041658 A1 | 2/2020 | Laurichesse | |

(Continued)

FOREIGN PATENT DOCUMENTS

WO 2023027815 A1 3/2023

OTHER PUBLICATIONS

3GPP TS 37.355: "3rd Generation Partnership Project; Technical Specification Group Radio Access Network; LTE Positioning Protocol (LPP) (Release 16)", 3GPP TS 37.355, V16.8.0, Mar. 2022, pp. 207-215.

(Continued)

*Primary Examiner* — Siu M Lee
(74) *Attorney, Agent, or Firm* — QUALCOMM Incorporated

(57) ABSTRACT

Techniques and apparatus for satellite-based determination of a position of a mobile device are disclosed. In some embodiments, such techniques include: obtaining a plurality of first satellite measurements in a first frequency, and a plurality of second satellite measurements in a second frequency; using at least qualified or consistent satellite measurements to determine the position of the mobile device, sending at least the qualified or consistent satellite measurements to a network device, or disabling usage of first satellite measurements in the first frequency or second satellite measurements in the second frequency.

28 Claims, 17 Drawing Sheets

(56) References Cited

U.S. PATENT DOCUMENTS

2021/0132236 A1\*  5/2021  Cookman .............. G01S 19/24
2021/0333410 A1   10/2021  Gum et al.
2023/0067256 A1\*  3/2023  Pon .................... H04W 64/003

OTHER PUBLICATIONS

International Search Report and Written Opinion—PCT/US2024/023700—ISA/EPO—Aug. 6, 2024.
Zhang G., et al., "A Novel GNSS based V2V Cooperative Localization to Exclude Multipath Effect using Consistency Checks", 2018, pp. 1465-1472.

\* cited by examiner

SATELLITE-BASED OPERATION OF A MOBILE DEVICE

BACKGROUND

1. Field of Disclosure

The present disclosure relates generally to the field of wireless communications, and more specifically to using satellite measurements to improve the operation of a wireless receiver, such as improved positioning and/or power efficiency.

2. Description of Related Art

Modern electronic devices frequently include systems that can receive signals from at least one satellite navigation system, commonly referred to as a Global Navigation Satellite System (GNSS), and use those signals to determine the location of the device and/or report its location to the network. Such GNSS systems may be integrated into consumer electronic devices, such as smartphones or smartwatches, as well as into navigation systems in different types of vehicles. Signals are received by GNSS receivers from multiple satellites orbiting the earth and processed to determine the GNSS receiver's location and, by proxy, the location of the device, vehicle, etc.

GNSS may be associated with different satellite systems, such as the Global Positioning System (GPS), GLONASS, Galileo, or Beidou.

BRIEF SUMMARY

In some aspects of the present disclosure, a method of satellite-based determination of a position of a mobile device is disclosed. In some embodiments, the method may include: obtaining a plurality of first satellite measurements in a first frequency, and a plurality of second satellite measurements in a second frequency; identifying, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and based on a quantity of the qualified one or more second satellite measurements exceeding a threshold number of measurements, using at least the qualified one or more second satellite measurements to determine the position of the mobile device, sending at least the qualified one or more second satellite measurements to a network device, or disabling usage of first satellite measurements in the first frequency or second satellite measurements in the second frequency.

In some embodiments, the method may include: obtaining a plurality of first satellite measurements in a first frequency, and a plurality of second satellite measurements in a second frequency; identifying, based on an error not meeting or exceeding an error threshold, one or more of the plurality of first satellite measurements in the first frequency which are consistent with one or more of the plurality of second measurements in the second frequency; and based on a quantity of the identified one or more of the plurality of first satellite measurements and the identified one or more of the plurality of second satellite measurements exceeding a threshold number of measurements, using at least the identified one or more of the plurality of first satellite measurements and the identified one or more of the plurality of second satellite measurements to determine the position of the mobile device, sending at least the identified one or more of the plurality of first satellite measurements and the identified one or more of the plurality of second satellite measurements to a network device, or disabling usage of first satellite measurements in the first frequency or second satellite measurements in the second frequency.

In some aspects of the present disclosure, a mobile device is disclosed. In some embodiments, the mobile device may include: one or more Global Navigation Satellite System (GNSS) receivers; one or more memory; and one or more processors communicatively coupled to the one or more GNSS receivers and the one or more memory, and configured to: obtain a plurality of first satellite measurements in a first frequency, and a plurality of second satellite measurements in a second frequency; identify, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and based on a quantity of the qualified one or more second satellite measurements exceeding a threshold number of measurements, use at least the qualified one or more second satellite measurements to determine a position of the mobile device, sending at least the qualified one or more second satellite measurements to a network device, or disabling usage of first satellite measurements in the first frequency or second satellite measurements in the second frequency.

In some embodiments, the mobile device may include: one or more Global Navigation Satellite System (GNSS) receivers; one or more memory; and one or more processors communicatively coupled to the one or more GNSS receivers and the one or more memory, and configured to: obtain a plurality of first satellite measurements in a first frequency, and a plurality of second satellite measurements in a second frequency; identify, based on an error not meeting or exceeding an error threshold, one or more of the plurality of first satellite measurements in the first frequency which are consistent with one or more of the plurality of second measurements in the second frequency; and based on a quantity of the identified one or more of the plurality of first satellite measurements and the identified one or more of the plurality of second satellite measurements exceeding a threshold number of measurements, use at least the identified one or more of the plurality of first satellite measurements and the identified one or more of the plurality of second satellite measurements to determine a position of the mobile device, send at least the identified one or more of the plurality of first satellite measurements and the identified one or more of the plurality of second satellite measurements to a network device, or disable usage of first satellite measurements in the first frequency or second satellite measurements in the second frequency.

In some aspects of the present invention, an apparatus is disclosed. In some embodiments, the apparatus may include: means for obtaining a plurality of first satellite measurements in a first frequency, and a plurality of second satellite measurements in a second frequency; means for identifying, based on an error not meeting or exceeding an error threshold, one or more of the plurality of second satellite measurements in the second frequency as qualified, the error being associated with (i) a first pseudorange determined based on the plurality of first satellite measurements and (ii)

a second pseudorange determined based on the plurality of second satellite measurements; and means for, based on a quantity of the qualified one or more second satellite measurements exceeding a threshold number of measurements, using at least the qualified one or more second satellite measurements to determine a position of the apparatus, sending at least the qualified one or more second satellite measurements to a network device, or disabling usage of first satellite measurements in the first frequency or second satellite measurements in the second frequency.

In some embodiments, the apparatus may include: means for obtaining a plurality of first satellite measurements in a first frequency, and a plurality of second satellite measurements in a second frequency; means for identifying, based on an error not meeting or exceeding an error threshold, one or more of the plurality of first satellite measurements in the first frequency which are consistent with one or more of the plurality of second measurements in the second frequency; and means for, based on a quantity of the identified one or more of the plurality of first satellite measurements and the identified one or more of the plurality of second satellite measurements exceeding a threshold number of measurements, using at least the identified one or more of the plurality of first satellite measurements and the identified one or more of the plurality of second satellite measurements to determine a position of the apparatus, sending at least the identified one or more of the plurality of first satellite measurements and the identified one or more of the plurality of second satellite measurements to a network device, or disabling usage of first satellite measurements in the first frequency or second satellite measurements in the second frequency.

In some aspects of the present invention, a non-transitory computer-readable apparatus is disclosed. In some embodiments, the non-transitory computer-readable apparatus may include a storage medium, the storage medium including a plurality of instructions configured to, when executed by one or more processors, cause a mobile device to: obtain a plurality of first satellite measurements in a first frequency, and a plurality of second satellite measurements in a second frequency; identify, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and based on a quantity of the qualified one or more second satellite measurements exceeding a threshold number of measurements, use at least the qualified one or more second satellite measurements to determine a position of the mobile device, send at least the qualified one or more second satellite measurements to a network device, or disable usage of first satellite measurements in the first frequency or second satellite measurements in the second frequency.

In some embodiments, the non-transitory computer-readable apparatus may include a storage medium, the storage medium including a plurality of instructions configured to, when executed by one or more processors, cause a mobile device to: obtain a plurality of first satellite measurements in a first frequency, and a plurality of second satellite measurements in a second frequency; identify, based on an error not meeting or exceeding an error threshold, one or more of the plurality of first satellite measurements in the first frequency which are consistent with one or more of the plurality of second measurements in the second frequency; and based on a quantity of the identified one or more of the plurality of first satellite measurements and the identified one or more of the plurality of second satellite measurements exceeding a threshold number of measurements, use at least the identified one or more of the plurality of first satellite measurements and the identified one or more of the plurality of second satellite measurements to determine a position of the mobile device, send at least the identified one or more of the plurality of first satellite measurements and the identified one or more of the plurality of second satellite measurements to a network device, or disable usage of first satellite measurements in the first frequency or second satellite measurements in the second frequency.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
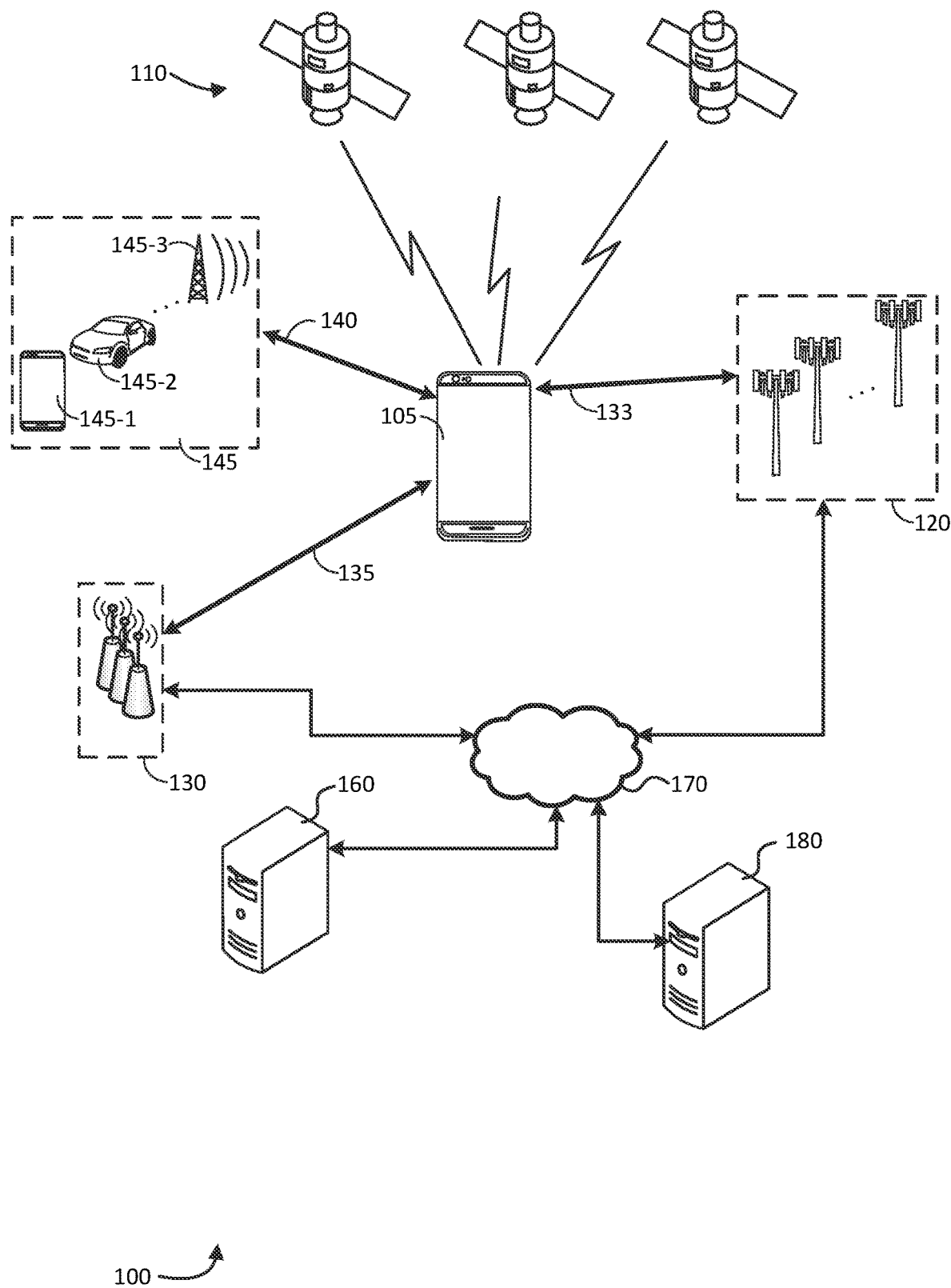
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO. EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a mobile device such as a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

Various aspects relate generally to satellite communications at a mobile device. In one aspect, different types of satellite measurements in different frequencies can be used to obtain a position fix of a mobile device. More particularly, usage of measurements from some wideband GNSS L5 bands (e.g., GPS L5, Galileo E5a) can be used to augment GNSS L1-based position fixing of a mobile device, e.g., in terms of accuracy and/or time to first fix (TTFF). For instance, in some aspects, a portion of obtained L1 measurements may be qualified using L5 measurements. That is, only a portion of the obtained L1 measurements are used for the position fix. These L5-qualified L1 measurements may have greater accuracy or reliability over using all obtained L1 measurements. One criterion for qualifying the L1 measurements may be an error associated with pseudoranges determined based on the L1 and L5 measurements, where the error does not exceed a threshold error. A threshold number of space vehicles (e.g., GNSS satellites) chosen to ensure sufficient redundancy for accuracy of the position fix may be another criterion for qualifying the L1 measurements. In this manner, L5 measurements may be used to improve L1-based position fix without directly using L5 to determine the position, e.g., in a tracking session.

In some aspects, qualification using L5 measurements can be used to determine whether to disable operation or L1 or L5. For example, if L1 and L5 measurements are consistent, and the L1 and L5 signals are strong, a mobile device may turn off L5 to conserve power. On the other hand, if L1 and L5 measurements are inconsistent, and the signals are weak, the mobile device may turn off L1.

In some aspects, an enhanced position fix may be determined based on the consistency between L1 and L5 measurements. For example, if a number of consistent L1 and L5 measurements exceeds a threshold number of space vehicles (e.g., GNSS satellites), the consistent L1 and L5 measurements may be used to improve a position fix.

Particular aspects of the subject matter described in this disclosure can be implemented to realize one or more of the following potential advantages. Various applications of wideband satellite measurements (e.g., L5) can improve the position fix. In some scenarios, positioning may be improved in tracking sessions (including emergency sessions in certain scenarios). Power efficiency and positioning may be improved in other scenarios. In some aspects, position fix accuracy and TTFF of a mobile device in a tracking session may be improved. Incorporating L5 measurements, for example, in the L1 measurements may augment the positioning accuracy without directly using the L5 measurements themselves to obtain the fix since L1 measurements qualified by L5 measurements are more reliable. In some aspects, power conservation is possible because the mobile device can selectively disable operation of L1 or L5 depending on the fidelity of the satellite measurements.

Additional details will follow after an initial description of relevant systems and technologies.

FIG. 1 is a simplified illustration of a positioning system 100 in which a mobile device 105, location server 160, and/or other components of the positioning system 100 can use the techniques provided herein for enhanced satellite-based operation the mobile device, according to different embodiments. The techniques described herein may be implemented by one or more components of the positioning system 100. The positioning system 100 can include: a mobile device 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and/or Non-Terrestrial Network (NTN) satellites; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra-Wideband (UWB), IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 comprising mobile devices are used in the position determination of a particular mobile device 105, the mobile device 105 for which the position is to be determined may be referred to as the "target mobile device," and each of the other mobile devices 145 used may be referred to as an "anchor mobile device." For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
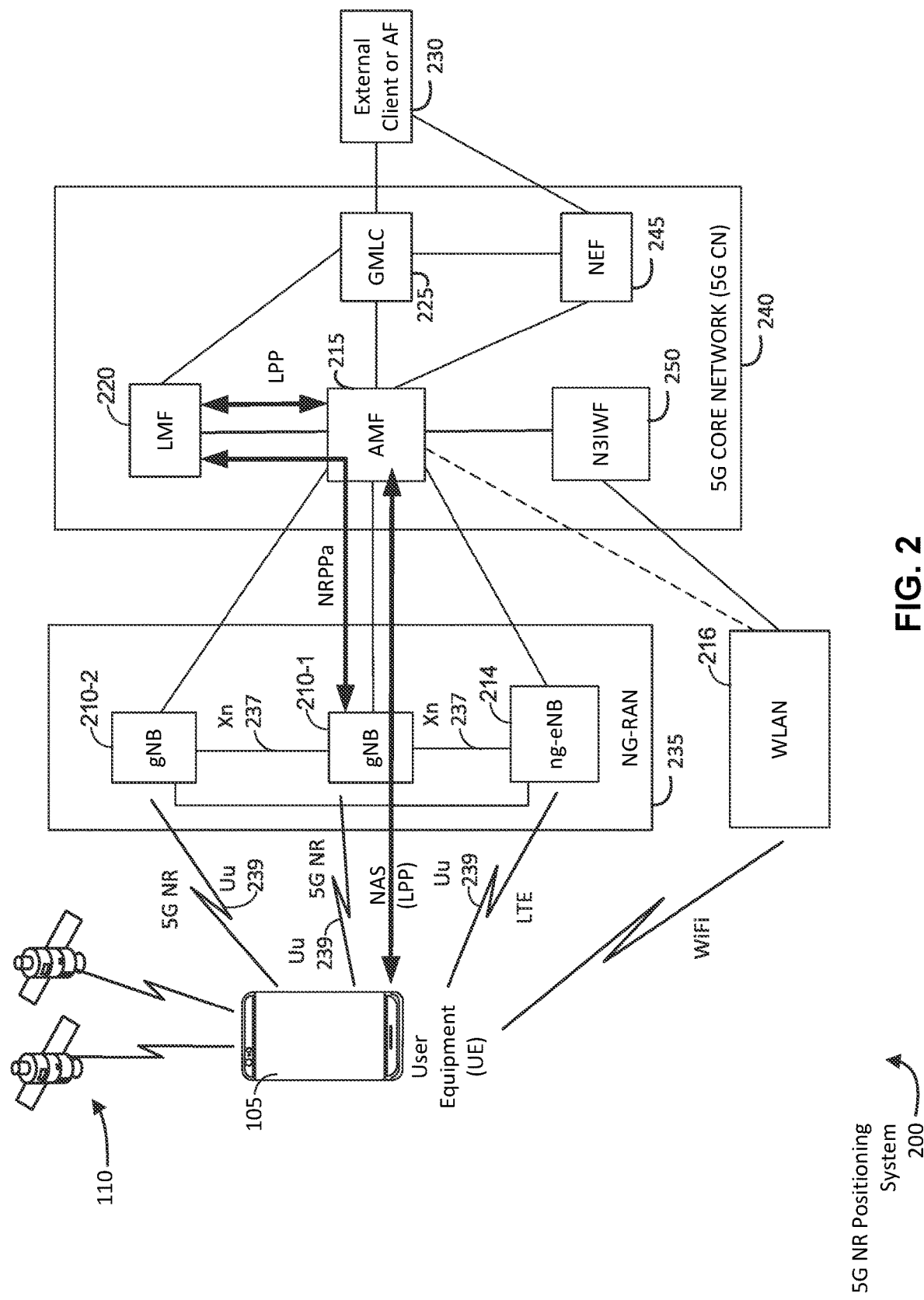
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a mobile device 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a mobile device 105 by using an LMF 220 (which may correspond with location server 160) to implement the one or more positioning methods. Here, the 5G NR positioning system 200 comprises a mobile device 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one mobile device 105 is illustrated, it will be understood that many mobile devices (e.g., hundreds, thousands, millions, etc.) may utilize the 5G NR positioning system 200. Similarly, the 5G NR positioning system 200 may include a larger (or smaller) number of satellites 110, gNBs 210, ng-eNBs 214, Wireless Local Area Networks (WLANs) 216, Access and mobility Management Functions (AMF) s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The mobile device 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, mobile device 105 may correspond to a cellphone, smartphone, laptop, tablet, personal data assistant (PDA), navigation device, Internet of Things (IoT) device, or some other portable or moveable device. Typically, though not necessarily, the mobile device 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The mobile device 105 may also support wireless communication using a WLAN 216 which (like the one or more RATs, and as previously noted with respect to FIG. 1) may connect to other networks, such as the Internet. The use of one or more of these RATs may allow the mobile device 105 to communicate with an external client 230 (e.g., via elements of 5G CN 240 not shown in FIG. 2, or possibly via a Gateway Mobile Location Center (GMLC) 225) and/or allow the external client 230 to receive location information regarding the mobile device 105 (e.g., via the GMLC 225). The external client 230 of FIG. 2 may correspond to external client 180 of FIG. 1, as implemented in or communicatively coupled with a 5G NR network.

The mobile device 105 may include a single entity or may include multiple entities, such as in a personal area network where a user may employ audio, video and/or data I/O devices, and/or body sensors and a separate wireline or wireless modem. An estimate of a location of the mobile device 105 may be referred to as a location, location estimate, location fix, fix, position, position estimate, or position fix, and may be geodetic, thus providing location coordinates for the mobile device 105 (e.g., latitude and longitude), which may or may not include an altitude component (e.g., height above sea level, height above or depth below ground level, floor level or basement level). Alternatively, a location of the mobile device 105 may be expressed as a civic location (e.g., as a postal address or the designation of some point or small area in a building such as a particular room or floor). A location of the mobile device 105 may also be expressed as an area or volume (defined either geodetically or in civic form) within which the mobile device 105 is expected to be located with some probability or confidence level (e.g., 67%, 95%, etc.). A location of the mobile device 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a mobile device, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to mobile device 105 via wireless communication between the mobile device 105 and one or more of the gNBs 210, which may provide wireless communications access to the 5G CN 240 on behalf of the mobile device 105 using 5G NR. The wireless interface between base stations (gNBs 210 and/or ng-eNB 214) and the mobile device 105 may be referred to as a Uu interface 239. 5G NR radio access may also be referred to as NR radio access or as 5G radio access. In FIG. 2, the serving gNB for mobile device 105 is assumed to be gNB 210-1, although other gNBs (e.g. gNB 210-2) may act as a serving gNB if mobile device 105 moves to another location or may act as a secondary gNB to provide additional throughput and bandwidth to mobile device 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (ELTE) wireless access to mobile device 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of mobile device 105 but may not receive signals from mobile device 105 or from other mobile devices. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to mobile devices but may transmit signals or data (relating to, e.g., PRS, assistance data, or other location data) to other network entities (e.g., one or more components of 5G CN 240, external client 230, or a controller) which may receive and store or use the data for positioning of at least mobile device 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for mobile device 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by mobile device 105 to other elements in 5G CN 240 and/or may support interworking of one or more protocols used by WLAN 216 and mobile device 105 to one or more protocols used by other elements of 5G CN 240 such as AMF 215. For example, N3IWF 250 may support IPSec tunnel establishment with mobile device 105, termination of IKEv2/IPSec protocols with mobile device 105, termination of N2 and N3 interfaces to 5G CN 240 for control plane and user plane, respectively, relaying of uplink (UL) and downlink (DL) control plane Non-Access Stratum (NAS) signaling between mobile device 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the mobile device 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the mobile device 105) and/or obtain downlink (DL) location measurements from the mobile device 105 that were obtained by mobile device 105 for DL signals received by mobile device 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to mobile device 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for mobile device 105 may be applicable to such other networks.

The gNBs 210 and ng-eNB 214 can communicate with an AMF 215, which, for positioning functionality, communicates with an LMF 220. The AMF 215 may support mobility of the mobile device 105, including cell change and handover of mobile device 105 from an access node (e.g., gNB 210, ng-eNB 214, or WLAN 216) of a first RAT to an access node of a second RAT. The AMF 215 may also participate in supporting a signaling connection to the mobile device 105 and possibly data and voice bearers for the mobile device 105. The LMF 220 may support positioning of the mobile device 105 using a CP location solution when mobile device 105 accesses the NG-RAN 235 or WLAN 216 and may support position procedures and methods, including mobile device assisted/mobile device based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the mobile device 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a mobile device 105's location) may be performed at the mobile device 105 (e.g., by measuring downlink PRS (DL-PRS) signals transmitted by wireless nodes such as gNBs 210, ng-eNB 214 and/or WLAN 216, and/or using assistance data provided to the mobile device 105, e.g., by LMF 220).

The Gateway Mobile Location Center (GMLC) 225 may support a location request for the mobile device 105 received from an external client 230 and may forward such a location request to the AMF 215 for forwarding by the AMF 215 to the LMF 220. A location response from the LMF 220 (e.g., containing a location estimate for the mobile device 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and mobile device 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of mobile device 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2. LMF 220 and mobile device 105 may communicate using an LTE Positioning Protocol (LPP) as defined in 3GPP TS 37.355. Here, LPP messages may be transferred between the mobile device 105 and the LMF 220 via the AMF 215 and a serving gNB 210-1 or serving ng-eNB 214 for mobile device 105. For example, LPP messages may be transferred between the LMF 220 and the AMF 215 using messages for service-based operations (e.g., based on the Hypertext Transfer Protocol (HTTP)) and may be transferred between the AMF 215 and the mobile device 105 using a 5G NAS protocol. The LPP protocol may be used to support positioning of mobile device 105 using mobile device assisted and/or mobile device based position methods such as A-GNSS, RTK, TDOA, multi-cell RTT, AoD, and/or ECID. The NRPPa protocol may be used to support positioning of mobile device 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-NB 214.

In the case of mobile device 105 access to WLAN 216, LMF 220 may use NRPPa and/or LPP to obtain a location of mobile device 105 in a similar manner to that just described for mobile device 105 access to a gNB 210 or ng-eNB 214. Thus, NRPPa messages may be transferred between a WLAN 216 and the LMF 220, via the AMF 215 and N3IWF 250 to support network-based positioning of mobile device 105 and/or transfer of other location information from WLAN 216 to LMF 220. Alternatively, NRPPa messages may be transferred between N3IWF 250 and the LMF 220, via the AMF 215, to support network-based positioning of mobile device 105 based on location related information and/or location measurements known to or accessible to N3IWF 250 and transferred from N3IWF 250 to LMF 220 using NRPPa. Similarly, LPP and/or LPP messages may be transferred between the mobile device 105 and the LMF 220 via the AMF 215, N3IWF 250, and serving WLAN 216 for mobile device 105 to support mobile device assisted or mobile device based positioning of mobile device 105 by LMF 220.

In a 5G NR positioning system 200, positioning methods can be categorized as being "mobile device assisted" or "mobile device based." This may depend on where the request for determining the position of the mobile device 105 originated. If, for example, the request originated at the mobile device (e.g., from an application, or "app," executed by the mobile device), the positioning method may be categorized as being mobile device based. If, on the other hand, the request originates from an external client 230, LMF 220, or other device or service within the 5G network, the positioning method may be categorized as being mobile device assisted (or "network-based").

With a mobile device-assisted position method, mobile device 105 may obtain location measurements and send the measurements to a location server (e.g., LMF 220) for computation of a location estimate for mobile device 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN 216. Additionally or alternatively, similar measurements may be made of sidelink signals transmitted by other mobile devices, which may serve as anchor points for positioning of the mobile device 105 if the positions of the other mobile devices are known. The location measurements may also or instead include measurements for RAT-independent positioning methods such as GNSS (e.g., GNSS pseudorange, GNSS code phase, and/or GNSS carrier phase for satellites 110), WLAN, etc.

With a mobile device-based position method, mobile device 105 may obtain location measurements (e.g., which may be the same as or similar to location measurements for a mobile device assisted position method) and may further compute a location of mobile device 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-NB 214), one or more APs (e.g., in WLAN 216), or N3IWF 250 may obtain location measurements (e.g., measurements of RSSI, RTT, RSRP, RSRQ, AoA, or TOA) for signals transmitted by mobile device 105, and/or may receive measurements obtained by mobile device 105 or by an AP in WLAN 216 in the case of N3IWF 250, and may send the measurements to a location server (e.g., LMF 220) for computation of a location estimate for mobile device 105.

Positioning of the mobile device 105 also may be categorized as UL, DL, or DL-UL based, depending on the types of signals used for positioning. If, for example, positioning is based solely on signals received at the mobile device 105 (e.g., from a base station or other mobile device), the positioning may be categorized as DL based. On the other hand, if positioning is based solely on signals transmitted by the mobile device 105 (which may be received by a base station or other mobile device, for example), the positioning may be categorized as UL based. Positioning that is DL-UL based includes positioning, such as RTT-based positioning, that is based on signals that are both transmitted and received by the mobile device 105. Sidelink (SL)-assisted positioning comprises signals communicated between the mobile device 105 and one or more other mobile devices. According to some embodiments, UL, DL, or DL-UL positioning as described herein may be capable of using SL signaling as a complement or replacement of SL. DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other mobile devices), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

As noted, the mobile device 105 of FIG. 1 may be capable of GNSS positioning. Details regarding GNSS positioning of a mobile device 105, or any device comprising a GNSS receiver, are provided hereafter with regard to FIG. 3.

Figure 3:
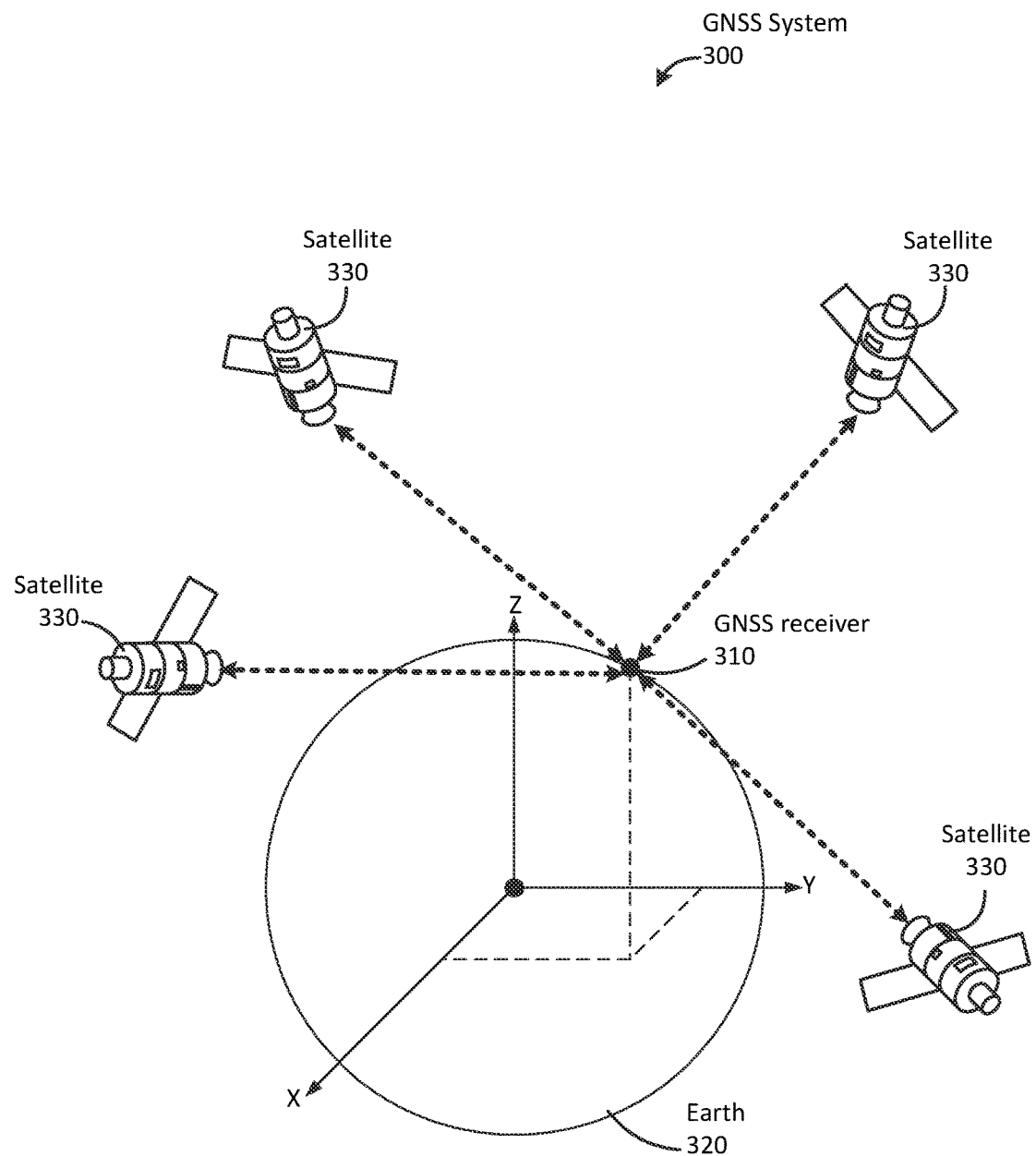
FIG. 3 is simplified diagram of a GNSS system, according to an embodiment.

FIG. 3 is a simplified diagram of a GNSS system 300, provided to illustrate how GNSS is generally used to determine an accurate location of a GNSS receiver 310 on the earth 320. Put generally, the GNSS system 300 enables an accurate GNSS position fix of the GNSS receiver 310, which receives RF signals from GNSS satellites 330 from one or more GNSS constellations. The types of GNSS receiver 310 used may vary, depending on application. In some embodiments, for instance, the GNSS receiver 310 may comprise a standalone device or component incorporated into another device (e.g., mobile device 105 of FIG. 1). In some embodiments, the GNSS receiver 310 may be integrated into industrial or commercial equipment, such as survey equipment, Internet of Things (IoT) devices, etc.

It will be understood that the diagram provided in FIG. 3 is greatly simplified. In practice, there may be dozens of satellites 330 and a given GNSS constellation, and there are many different types of GNSS systems. As noted, GNSS systems include GPS, Galileo, GLONASS, or BDS. Additional GNSS systems include, for example, Quasi-Zenith Satellite System (QZSS) over Japan, Indian Regional Navigational Satellite System (IRNSS) over India, etc. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration/multilateration, which is a method of determining position by measuring distances to points at known coordinates. In general, the determination of the position of a GNSS receiver 310 in three dimensions may rely on a determination of the distance between the GNSS receiver 310 and four or more satellites 330. As illustrated, 3D coordinates may be based on a coordinate system (e.g., XYZ coordinates; latitude, longitude, and altitude; etc.) centered at the earth's center of mass. A distance between each satellite 330 and the GNSS receiver 310 may be determined using precise measurements made by the GNSS receiver 310 of a difference in time from when a RF signal is transmitted from the respective satellite 330 to when it is received at the GNSS receiver 310. To help ensure accuracy, not only does the GNSS receiver 310 need to make an accurate determination of when the respective signal from each satellite 330 is received, but many additional factors need to be considered and accounted for. These factors include, for example, clock differences at the GNSS receiver 310 and satellite 330 (e.g., clock bias), a precise location of each satellite 330 at the time of transmission (e.g., as determined by the broadcast ephemeris), the impact of atmospheric distortion (e.g., ionospheric and tropospheric delays), and the like.

To perform a traditional GNSS position fix, the GNSS receiver 310 can use code-based positioning to determine its distance to each satellite 330 based on a determined delay in a generated pseudorandom binary sequence received in the RF signals received from each satellite, in consideration of the additional factors and error sources previously noted. With the distance and location information of the satellites 330, the GNSS receiver 310 can then determine a position fix for its location. This position fix may be determined, for example, by a Standalone Positioning Engine (SPE) executed by one or more processors of the GNSS receiver 310. However, code-based positioning is relatively inaccurate and, without error correction, and is subject to many of the previously described errors. Even so, code-based GNSS positioning can provide an positioning accuracy for the GNSS receiver 310 on the order of meters.

More accurate carrier-based ranging is based on a carrier wave of the RF signals received from each satellite, and may use measurements at a base or reference station (not shown) to perform error correction to help reduce errors from the previously noted error sources. More specifically, errors (e.g., atmospheric errors sources) in the carrier-based ranging of satellites 330 observed by the GNSS receiver 310 can be mitigated or canceled based on similar carrier-based ranging of the satellites 330 using a highly accurate GNSS receiver at the base station at a known location. These measurements and the base station's location can be provided to the GNSS receiver 310 for error correction. This position fix may be determined, for example, by a Precise Positioning Engine (PPE) executed by one or more processors of the GNSS receiver 310. More specifically, in addition to the information provided to an SPE, the PPE may use base station GNSS measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters). (An SPE and/or PPE may be referred to herein as a GNSS positioning engine, and may be incorporated into a broader positioning engine that uses other (non-GNSS) positioning sources.)

Multi-frequency GNSS receiver is use satellite signals from different GNSS frequency bands (also referred to herein simply as "GNSS bands") to determine desired information such as pseudoranges, position estimates, and/or time. Using multi-frequency GNSS may provide better performance (e.g., position estimate speed and/or accuracy) than single-frequency GNSS in many conditions. However, as discussed in more detail hereafter, using multi-frequency GNSS typically uses more power than single-frequency GNSS, e.g., processing power and battery power (e.g., to power a processor (e.g., for determining measurements), baseband processing, and/or RF processing).

Referring again to FIG. 3, the satellites 330 may be members of a single satellite constellation, i.e., a group of satellites that are part of a GNSS system, e.g., controlled by a common entity such as a government, and orbiting in complementary orbits to facilitate determining positions of entities around the world. One or more of the satellites 330 may transmit multiple satellite signals in different GNSS frequency bands, such as L1, L2, and/or L5 frequency bands. The terms L1 band, L2 band, and L5 band are used herein because these terms are used for GPS to refer to respective ranges of frequencies. Various receiver configurations may be used to receive satellite signals. For example, a receiver may use separate receive chains for different frequency bands. As another example, a receiver may use a common receive chain for multiple frequency bands that are close in frequency, for example L2 and L5 bands. As another example, a receiver may use separate receive chains for different signals in the same band, for example GPS L1 and GLONASS L1 sub-bands. A single receiver may use a combination of two or more of these examples. These configurations are examples, and other configurations are possible.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BDS, and is broken into various bands, including L1, L2, and L5. For location purposes, the L1 band has historically been used by commercial GNSS receivers. However, measuring GNSS signals across more than one band may provide for improved accuracy and availability.

Figure 4:
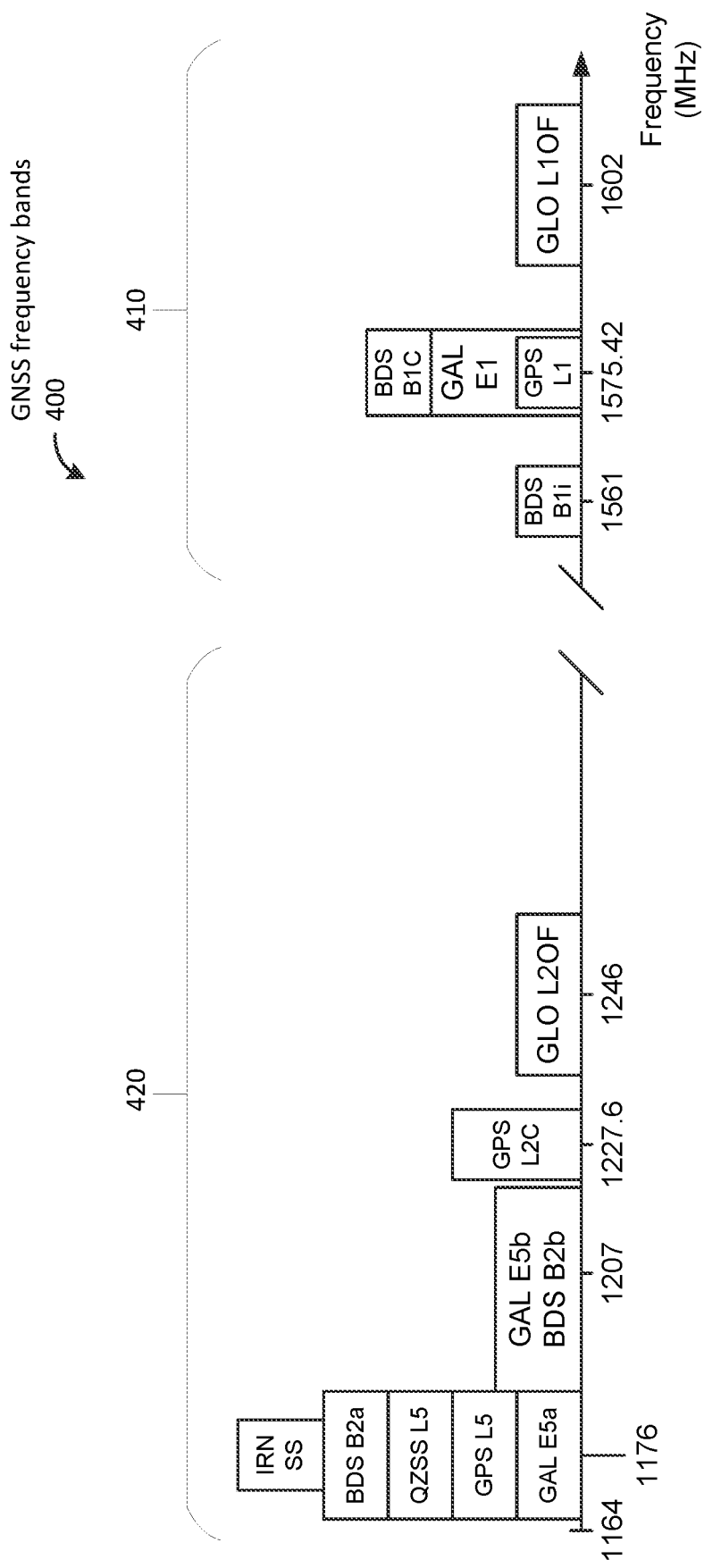
FIG. 4 illustrates a diagram of example GNSS frequency bands.

FIG. 4 is a diagram of GNSS frequency bands 400, which may be used in GNSS receivers, according to embodiments herein. Like other figures, FIG. 4 is not shown to scale. The GNSS frequency bands 400 show that GNSS constellations operate on several frequencies in the L-Band. The L1 frequency band typically covers frequencies from 1559 MHz to 1606 MHz and includes L1 signals from GPS, Galileo, BDS, GLONASS, and QZSS GNSS constellations. For example, the GPS L1 band is centered at about 1575.42 MHz. Bands within this spectrum may be referred to herein as the "upper bands" 410. The same constellations that use these upper bands 410 may also transmit concurrently using one or more other bands in the frequency spectrum generally from 1164 MHz to 1246 MHz, which may be referred to herein as the "lower bands" 420. Example bands within the lower bands 420 include the L2 frequency band centered at about 1227.6 MHz and the L5 frequency band centered at about 1176 MHz. Satellites may transmit, for example L2 and/or L5 signals along with L1 signals. L2 and L5 signals may complement the L1 signals, which have been used for many years. For example, the L5 signals have wider signal bandwidth than the L1 signals, which helps improve positioning performance in multi-path environments. Also, using the L5 signals in addition to the L1 signals can allow for frequency diversity. The L2 and L5 signals are far enough away in frequency from the L1 signals, for example, that different processing paths are typically used to measure the L2 and L5 signals versus the L1 signals. While the discussion herein focuses on the L1 and L5 bands, the discussion (including the claims) is not limited to these bands, nor is the discussion limited to the use of satellite signals in two or three bands.

Figure 5:
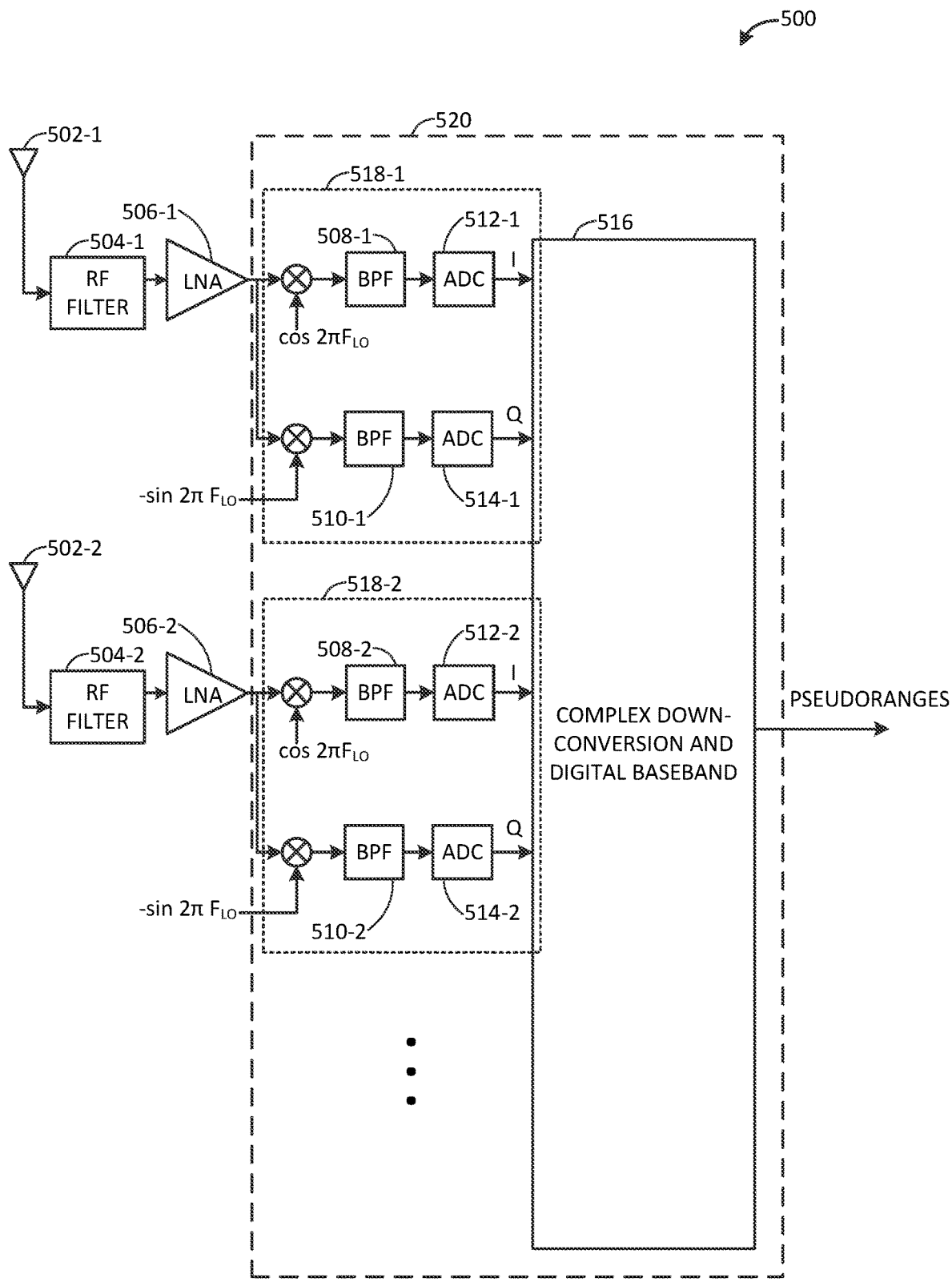
FIG. 5 illustrates a simplified block diagram of an example GNSS receiver, according to an embodiment.

FIG. 5 illustrates a simplified block diagram of an example signal processing architecture 500 that may be used in a GNSS receiver to implement GNSS signal acquisition and tracking using multiple GNSS frequency bands. This signal processing architecture 500 may be implemented in hardware and/or software components of a GNSS receiver, such as the GNSS receivers discussed elsewhere herein, including GNSS receiver 1680 of FIG. 16, which is described in more detail hereafter.

It can be noted that alternative embodiments may implement variations to the signal processing architecture 500 illustrated in FIG. 5. For example, the signal processing architecture 500 illustrates two RF chains (a first RF chain represented by components 502-1 to 514-1, and a second RF chain represented by components 502-2 to 514-2), however embodiments are not so limited. Alternative embodiments may have any number of RF chains, including only one. As noted hereafter, different RF chains may be used to receive and process different bands or groups of bands. In some embodiments, for example, the first RF chain represented by components 502-1 to 514-1 may receive and process one or more upper bands 410 (of FIG. 4), and the second RF chain represented by components 502-2 to 514-2 receive and process one or more lower bands 420. Moreover, components such as antennas, filters, amplifiers, or any combination thereof may be shared by different RF chains. Different RF chains may employ different architectures. That said, some RF chains may employ the same architecture. As illustrated in FIG. 5, the architecture of the second RF chain mirrors that of the first. As such, the following description of the components 502-1 to 514-1 may be applied to components 502-2 to 514-2 (e.g., for a different pair of GNSS signals).

A single RF chain may be capable of receiving and processing multiple GNSS signals. For example, the first RF chain represented by components 502-1 to 514-1 may be used to process two GNSS signals, $GNSS_1$ and $GNSS_2$, by mixing the received signals with a local oscillator (LO) signal having a frequency $F_{LO}$ that is determined based, at least in part, on first and second carrier frequencies $f_1$ and $f_2$. As shown in FIG. 5 according to a particular implementation, signal processing architecture 500 may receive signals $GNSS_1$ and $GNSS_2$ at a single antenna 502-1, a bandpass RF filter 504-1 such as surface acoustic wave (SAW) filter, and low-noise amplifier (LNA) 506-1. The received GNSS signals may then be complexly downconverted to intermediate frequencies by mixing the received signals with the LO signal as shown.

In this context, a "downconversion" may relate to transforming an input signal having a first frequency characteristic to an output signal having second frequency characteristic. In one particular implementation, although claimed subject matter is not limited in this respect, such a downconversion may comprise transformation of a first signal to a second signal, where the second signal has a frequency characteristic of a lower frequency than that of the first signal. Here, in particular examples, such a downconversion may comprise transformation of a radio frequency (RF) signal to an intermediate frequency (IF) signal, or transformation of an IF signal to a baseband signal and/or baseband information. However, these are merely examples of a downconversion and claimed subject matter is not limited in this respect.

Returning to the example in which the first RF chain represented by components 502-1 to 514-1 is used to process two GNSS signals, by selecting $F_{LO}$ at about a midpoint between $f_1$ and $f_2$, portions of downconverted signals may substantially covered by bandpass filters (BPFs) 508-1 and 510-1. Here, for example, a selection of a particular frequency for $F_{LO}$ may result in an image frequency component of one downconverted GNSS signal that may substantially overlapping a desired signal component of another downconverted GNSS signal. In particular embodiments, impacts of such overlapping can be avoided without attenuating image frequency components before mixing with LO. It should be understood, however, that in other implementations $F_{LO}$ may be selected to be somewhere other than about a midpoint between $f_1$ and $f_2$.

In-phase (I) and quadrature (Q) components filtered by associated BPFs 508-1 and 510-1 may then be digitally sampled at analog to digital conversion circuits (ADCs) 512 and 514 to provide digitally sampled in-phase and quadrature components for further processing, including complex downconversion (e.g., to baseband) and digital baseband processing 516. Here, ADCs 512-1 and 514-1 may be adapted to sample output signals of BPFs 508-1 and 510-1 at or above the Nyquist rate of the combined signal.

Also, the presently illustrated implementation includes ADCs 512-1 and 514-1 between first and second downconversion stages (e.g., within IF downconversion and processing block 518-1). It should be understood, however, that other architectures may be implemented without deviating from claimed subject matter. In other implementations, for example, analog to digital conversion may occur following a second downconversion. Again, these are merely example implementations and claimed subject matter is not limited in these respects.

Also, in alternative implementations, ADCs 512-1 and 514-1 may be replaced with a single complex ADC or with a single time shared and/or multiplexed ADC with appropriate delays to be shared between in-phase and quadrature signal paths.

In particular implementations, $GNSS_1$ and/or $GNSS_2$ may comprise any one of several pairs of different GNSS signals. In one particular embodiment, although claimed subject matter is not limited in this respect, $GNSS_1$ and $GNSS_2$ may be selected such that $f_1$ and $f_2$ are near in frequency to enable low cost manufacture of SAW 504-1 and/or LNA 506-1 by limiting an operating band. Here, for example, $GNSS_1$ and $GNSS_2$ may comprise any one of several pairs such as GPS L1 and GLONASS L1 (where $f_1$=1575 MHz and $f_2$=1602 MHz), GPS L1 and Compass L1 (where $f_1$=1575 MHz and $f_2$=1590 or 1561 MHz), Galileo L1 and GLONASS L1 (where $f_1$=1575 MHz and $f_2$=1602 MHz), GPS L2 and GLONASS L2 (where $f_1$=1228 MHz and $f_2$=1246 MHz) and GPS L2 and Compass L2 (where $f_1$=1228 MHz and $f_2$=1269 or 1207 MHz). It should be understood, however, that these are merely particular examples of GNSS pairs that may be selected in particular implementations, and claimed subject matter is not limited to any particular GNSS pair.

In particular embodiments, the bandwidth of BPFs 508-1 and 510-1 may be centered at about a common intermediate frequency $IF_o$ to process portions of GNSS signals received from both $GNSS_1$ and $GNSS_2$. In addition, the bandwidth of BPFs 508 and 510 may be implemented to be wide enough to capture enough information GNSS signals received from both $GNSS_1$ and $GNSS_2$ without introducing significant noise outside the bands of components 502 and 504. Additionally, BPFs 508-1 and 510-1 may be chosen to be narrow enough to enable sampling by ADCs 512-1 and 514-1 at a given sample rate (e.g., at about the Nyquist rate) without significant distortion.

According to particular implementations, sampled in-phase and quadrature components provided by ADCs 512-1 and 514-1 may be further processed according to a complex downconversion and digital baseband 516, which can be used to generate in-phase and quadrature components, and output pseudoranges derived from the GNSS signals. According to some embodiments, the output of the complex downconversion and digital baseband 516 may more broadly be referred to as a measurement, where the measurement may comprise a pseudorange, or a pseudorange and carrier phase.

As noted, the signal processing architecture 500 may have many RF chains to be able to receive and process many GNSS signals. Each RF chain may receive and process one or more GNSS signals (e.g., in pairs), as previously described. In some embodiments, an RF chain may receive and process a single GNSS signal, in which case an similar to the first RF chain represented by components 502-1 to 514-1 may be used, but modified (e.g., components may be tuned for the frequency of the single GNSS signal).

In the example provided in FIG. 5, components of the signal processing architecture 500 included in block 518 may be integrated into a single IC, while other components, such as antennas 502, RF filters 504, and LNAs 506, may be included in separate circuitry. Even so, on-chip components of RF chains such as IF downconversion and processing blocks 518 may be powered down if RF chains are not in use, resulting in overall power savings. Thus, according to some embodiments, a GNSS receiver may be capable of powering down at least portions of and RF chain when not in use, including corresponding on-chip components within block 520 and/or components outside of block 520. For example, if a GNSS receiver is using one or more GNSS signals received and processed by the first RF chain represented by components 502-1 to 514-1 but not using any GNSS signals received and processed by the second RF chain represented by components 502-2 to 514-2, the GNSS receiver may keep components 502-1 to 514-1 powered on (e.g., operating the first RF chain to receive and process the one or more GNSS signals used by the GNSS receiver) and power down or power off one or more of components 502-2 to 514-2.

Generally put, the more GNSS signals, or bands, used by a GNSS receiver to determine location and/or pseudorange, the more accurate the ultimate location determination will be. As previously noted, however, this additional accuracy comes at the cost of additional power usage. With this in mind, embodiments provided herein leverage the capability of a GNSS receiver to power down separate RF chains to enable GNSS band selection based on application requirements specific to a position determination.

As a specific example, GPS L1 and L5 bands relatively far apart in frequency, as illustrated in FIG. 4, relative to other GNSS bands. Thus, in implementation, a GNSS receiver typically utilizes different RF chains and circuitry to separately receive and process GNSS signals on these bands, which can be later combined at the digital level. This results in a lot more power usage if both bands are being used. That said, the use of L5 can increase the accuracy of the pseudoranges output by the GNSS receiver which, in turn, increases the accuracy of the position determination. This is due, in part, to the fact that using two bands, L1 and L5, can enable a GNSS receiver to determine and reduce or eliminate ionosphere error. Further, a GNSS receiver may use a single RF chain to receive and process signals from both L2 and L5 GPS bands, as previously noted. Thus, using both L2 and L5 bands (in addition to L1) may take a relatively small amount of additional power than using L5 alone. A GNSS receiver may therefore use both L2 and L5 bands for increased accuracy if use of L1 band alone is insufficient, according to some embodiments. However, L5 bands may not be available for positioning in certain circumstances such as when L5 band signals are not tracked or cannot be tracked (e.g., during certain emergency sessions). According to some embodiments of the present disclosure, L5 measurements and pseudoranges derived therefrom may still be used to improve positioning based on L1 measurements during a tracking session, or improve power conservation. Example methodologies are provided below.

Qualification of Satellite Signal Measurements for Enhanced Positioning

Figure 6:
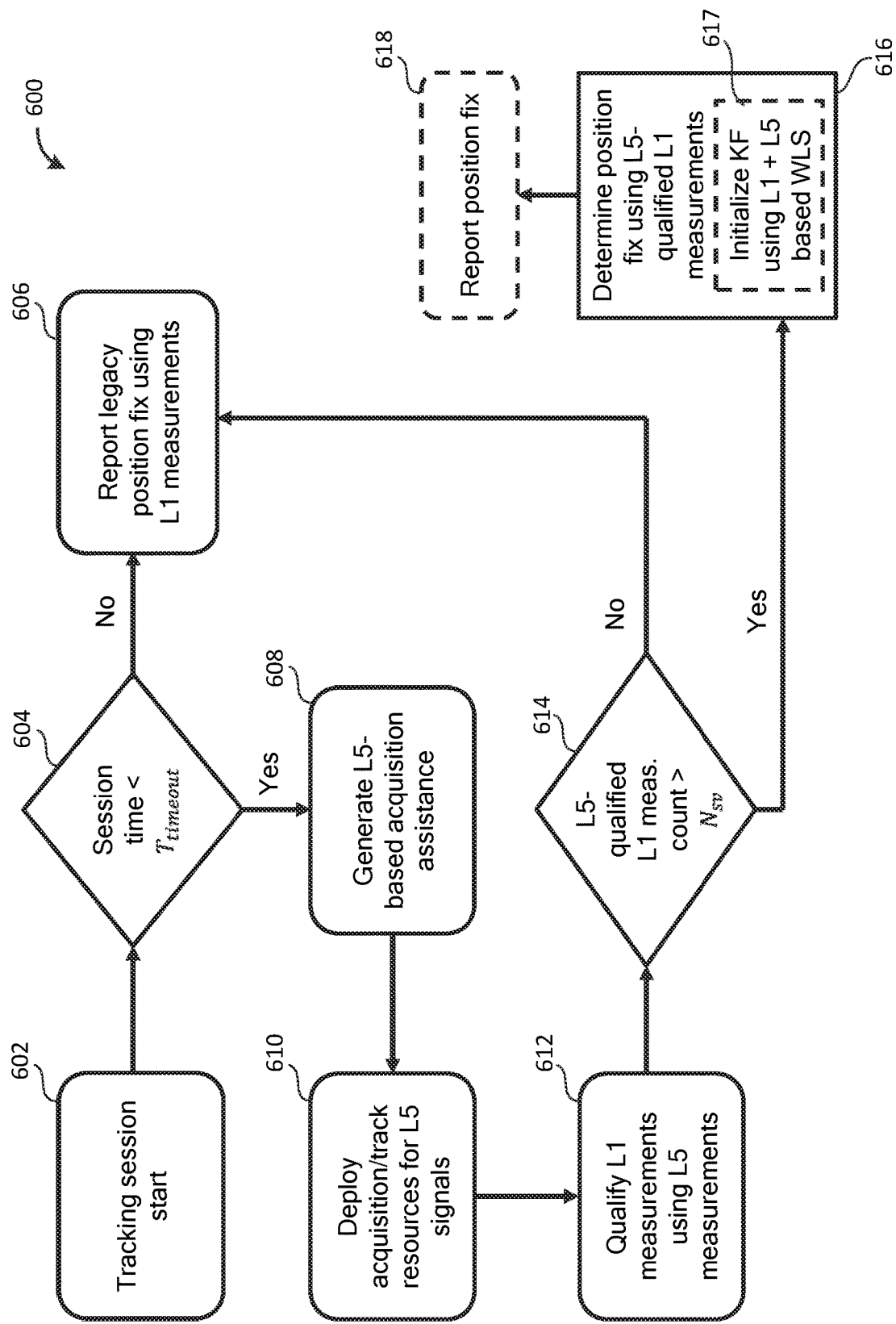
FIG. 6 is a flow diagram of a first process for enhanced positioning of a mobile device by qualifying satellite signal measurements, according to some embodiments.

FIG. 6 is a flow diagram 600 of a first process for enhanced positioning of a mobile device by qualifying satellite signal measurements, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may be in a lower band (e.g., lower bands 420). For example, the first frequency may be a GNSS L1 band, and the second frequency may be a GNSS L5 band. An example corresponding to the GNSS L1 band is the GPS L1 band, and an example corresponding to the GNSS L5 band is the GPS L5 band. Other corresponding satellite systems may be used in other implementations. The qualification process will be described below using the example of GNSS L1 and L5 bands, but in other implementations, measurements in other bands (e.g., L2 bands) may be used for qualification of L1 measurements.

Figure 16:
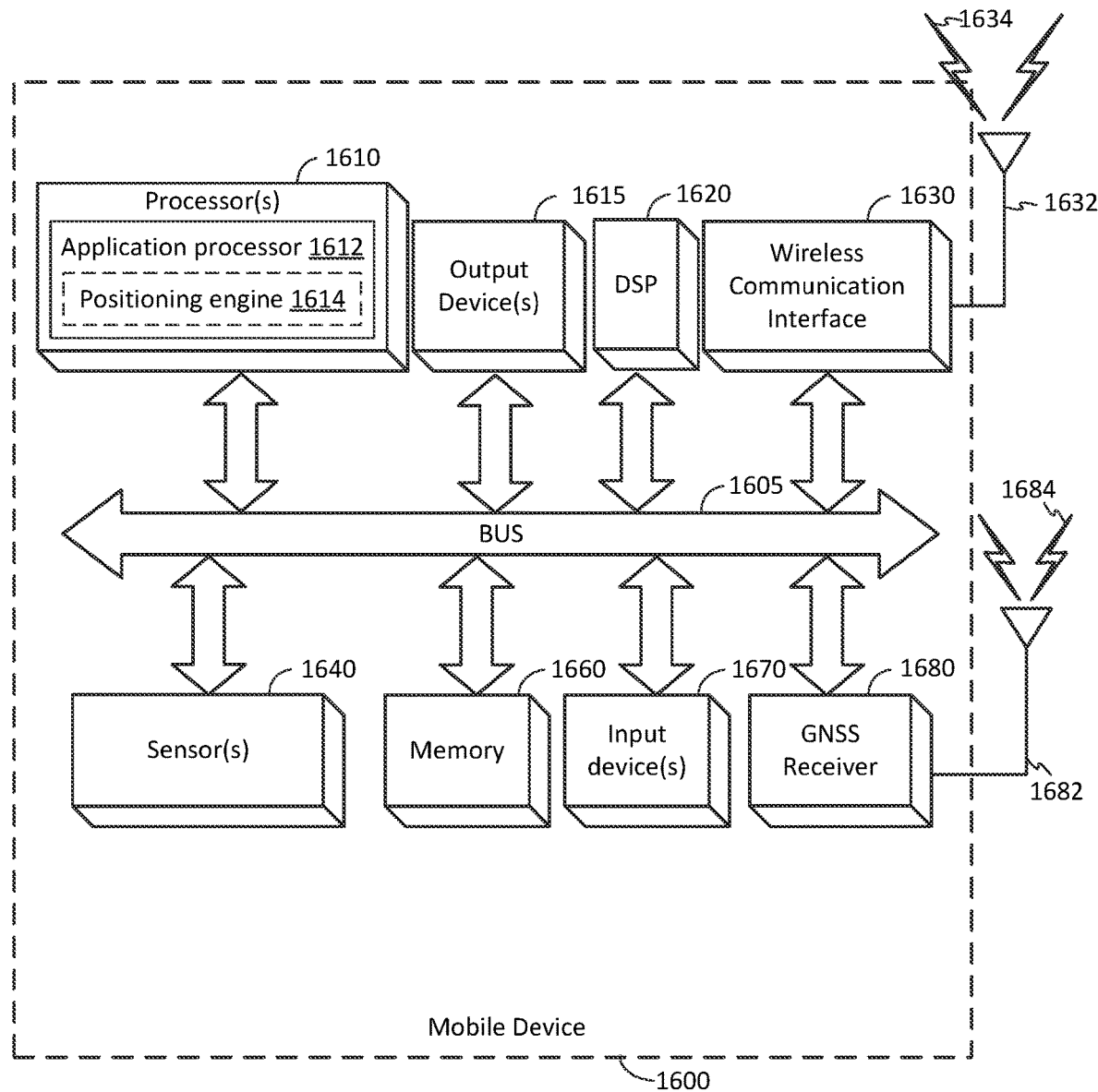
FIG. 16 is a block diagram of an embodiment of a mobile device, which can be utilized in embodiments as described herein.

Structure for performing the functionality illustrated in one or more of the blocks shown in FIG. 6 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 6 may be performed in any suitable order, not necessarily the order depicted in FIG. 6. Further, the process shown in FIG. 6 may include additional or fewer operations than those depicted in FIG. 6.

At block 602, a tracking session may be initiated. In some scenarios, the mobile device may start a mobile-station-based (MSB) location determination session in the tracking session, where the position estimation occurs at the mobile device. In some scenarios, an emergency session such as an Enhanced 911 (E911) session may be initiated, which is a type of a system used for communications seeking emergency assistance (e.g., police, fire, ambulance, and rescue services). In an E911 session, calls (including Voice over Internet Protocol (VOIP) calls) and wireless communications may be routed to a Public Safety Answering Point (PSAP), or in some implementations, communications with a server (e.g., location server 160 or external client 180). An emergency session may be characterized by a need for rapid location determination of the mobile device and the user of the device.

Therefore, at block 604, the mobile device may determine whether session time for the tracking session has reached a timeout period. An example timeout period for the tracking session may be 20 seconds. Other example timeout periods may be 24 seconds or 60 seconds. The timeout period may provide sufficient time to perform the qualification of satellite measurements as described below. In an example scenario in which a tracking session is initiated, given that a position fix of the mobile device should be reported within a short period of time, typical positioning without the qualification process may only require 3-4 seconds. However, the remaining time from the longer timeout period may be used for the qualification process to obtain a more accurate position fix. Various other timeout periods may be selected in different implementations.

If the session time has reached timeout without being able to perform the following block 608 (e.g., it has been the length of the timeout period since the start of the tracking session), the mobile device may proceed to report a position fix using legacy procedure at block 606. In some implementations, legacy procedure may involve using L1 measurements to obtain the position of the mobile device for reporting.

If the session time has not reached timeout (e.g., the length of the timeout period has not elapsed since the start of the tracking session), the mobile device may generate L5-based acquisition assistance at block 608. To acquire the signals to find the signals, so-called acquisition assistance information may be generated. Such information can help the GNSS receiver narrow down the search space rather than search all possible or at least a wider range of frequencies.

At block 610, the mobile may further deploy resources to acquire and track GNSS L5 signals. Furthermore, GNSS L1 signals may be acquired. In some embodiments, deploying resources for L5 signals may include activating an RF chain to receive and process L5 signals, such as the second RF chain represented by components 502-2 to 514-2 in FIG. 5, where the first RF chain represented by components 502-1 to 514-1 may be used to receive and process L1 signals.

At block 612, the mobile may obtain L1 measurements and L5 measurements, and qualify the L1 measurements using the L5 measurements to obtain L5-qualified L1 measurements. L1 and L5 measurements may include, e.g., pseudorange, receiver time, satellite transmit time, satellite position, satellite velocity and clock parameters, among other types of information. In some embodiments, the mobile device may qualify the L1 measurements based on a consistency check based on an error associated with pseudoranges associated with the L5 and L1 measurements. This may be one criterion for using the enhanced positioning rather than the legacy positioning at block 606. Another criterion may be the L5-qualified L1 measurements exceeding a threshold number of space vehicles (e.g., GNSS satellites), described with respect to block 614. Both criteria are described below.

As noted above, the receiver mobile device may use the L5 measurements to qualify L1 measurements with a consistency check. This can be done by obtaining (1) a pseudorange determined based on L5 signals, (2) a pseudorange determined based on L1 signals, (3) a time bias between the L1 and L5 measurements, and (4) an error threshold. A pseudorange may refer to an approximation of distance between a GNSS satellite and the receiver (e.g., mobile device). In some implementations, the pseudoranges may be determined by processing the L1 and L5 satellite signals using the components 502-1 to 514-1 as discussed with respect to FIG. 5.

In some embodiments, qualifying the L1 measurements can include determining an error between the L5 pseudorange measurements ($PR_{L5}$) and the L1 pseudorange measurements ($PR_{L1}$), accounting for the time bias between the L5 pseudorange measurements and the L1 pseudorange measurements ($TB_{L1\text{-}L5}$) such that the L5 pseudorange measurements are pre-corrected. Accounting for the time base may involve combining (e.g., adding) the L5 pseudorange with the time bias.

In some implementations, the time bias ($TB_{L1\text{-}L5}$) may be known and predetermined, e.g., based on past measurements in one or more different conditions where GNSS signals are strong (e.g., open sky environment). L1 measurements and/or L5 measurements may be obtained during normal operation of the mobile device, e.g., outside of the tracking session. Hence, the mobile device can estimate the L1-L5 time bias prior to any tracking sessions and store it for later use (e.g., during a tracking session) or update or calibrate it over time, e.g., periodically.

In some implementations, the error threshold may be set based on environmental context. Examples of the environmental contexts may include open sky, semi-urban, and urban or challenging environment. In some cases, the error threshold may be set to be lower where the environmental context is more forgiving, such as an open sky where few obstructions are present, if any. Conversely, the error threshold may be set higher where the environmental context is more challenging, such as an urban environment, urban canyon with many buildings, walls, or surfaces, a tunnel, or an at least partially underground location.

In some implementations, the type of environment (open sky, urban environment, semi-urban, etc.) may be determined or inferred based on signal strength or signal-to-noise ratio (SNR) associated with received GNSS L1 or L5 signals (including unqualified ones). Some statistics for signal strength or SNR may be determined as well, e.g., mean or standard deviation. As examples, a low signal strength or SNR may provide a presumption that the environment is an urban environment or indoor environment, while a high signal strength or SNR may indicate an open sky, with various degrees of indications between or outside these examples (e.g., very low signal strength or SNR may indicate a subterranean location). In some cases, the type of environment may be known based on prior measurements, e.g., during normal operation, or based on information provided to the mobile device from the network (e.g., base stations, or indoor APs such as Wi-Fi APs).

If the error is less than an error threshold ($\text{Err}_m$), then the given L1 measurements may be considered to be qualified. This approach can be expressed as follows:

$$|PR_{L5} + TB_{L1-L5} - PR_{L1}| < \text{Err}_m \qquad \text{Eqn. 1}$$

Stated another way, each of the L5 pseudorange measurements corrected by the time bias between L1 and L5 measurements is compared with each corresponding one of the L1 pseudorange measurements, according to some embodiments. In theory, ideally, the differences and the mean value of the differences are close to 0. The differences determined from this comparison, or the error, are then compared with the error threshold. According to this consistency check, some L1 measurements may be considered qualified, while some other L1 measurements may not be qualified because the associated error is larger than the error threshold.

Notwithstanding the consistency check above (checking the error between L5 and L1 measurements), a GNSS constellation may have 10-20 satellites that normally provide 10-20 measurements to determine the position fix, so it is desirable to have a sufficient number of satellites providing L5-qualified L1 measurements for high accuracy.

Hence, at block 614, the quantity of L5-qualified L1 measurements resulting from the consistency check may be compared to a threshold number ($N_{sv}$) of space vehicles (e.g., GNSS satellites) chosen to ensure sufficient redundancy for accuracy of the position fix. As such, accuracy may be affected by both $\text{Err}_m$ and $N_{sv}$. As an illustrative example of this "satellite count check," more than five (5) L5-qualified L1 measurements may be needed to determine sufficient redundancy ($N_{sv}>5$) in an open sky environment. However, more than nine (9) L5-qualified L1 measurements may be needed for sufficient redundancy in an urban canyon or another challenging environment ($N_{sv}>9$), or more than seven (7) L5-qualified L1 measurements may be needed for sufficient redundancy in a semi-urban area. The threshold number may be selected according to the environment or other factors as needed for the desired accuracy.

As noted, one criterion for using the enhanced positioning was the L5-qualified L1 measurements exceeding a threshold number of space vehicles. If, according to the comparison to the threshold number $N_{sv}$, the quantity of L5-qualified L1 measurements do not exceed the threshold number, the mobile device may revert to using legacy positioning to obtain the position fix, at block 606.

On the other hand, if the quantity of L5-qualified L1 measurements exceeds the threshold number, the mobile device may determine the position fix based on the L5-qualified L1 measurements obtained at block 612, at block 616. In some embodiments, the position fix may be determined using the L5-qualified L1 measurements based on a known weighted least squares (WLS) methodology.

In some variants, unqualified L1 measurements (those that have errors that exceed the error threshold and thus do not pass the consistency check) may be omitted from the positioning determination at block 616. In some variants, the unqualified L1 measurements may still be used in determining the position fix but de-weighted. That is to say, in a first variant, the receiver mobile device may determine a position fix based only on the L1 measurements that meet the above two conditions: (1) qualified through the consistency check and (2) having a sufficient quantity of measurements. In a second variant, the receiver mobile device may determine a position fix based on all the L1 measurements (including the unqualified L1 measurements) but de-weight the L1 measurements that did not meet the L5-based qualification.

Optionally, at block 617, in some embodiments, the mobile device may initialize a Kalman filter with the position fix using L1 measurements and L5 measurements. For example, L5 measurements can be used for purposes such as qualifying L1 measurements as described above, or initializing the Kalman filter at block 617.

After initialization, the Kalman filter may use L1 measurements in deriving its solution. In some implementations, all L1 measurements (including unqualified L1 measurements) may be used with the Kalman filter. In some implementations, only L5-qualified L1 measurements may be used with the Kalman filter, while omitting or de-weighting unqualified L1 measurements. A Kalman filter-based position fix may thereby be obtained by the mobile device. Using a Kalman filter may provide a more accurate estimation of the position fix using a series of measurements, e.g., L1 measurements and L5 measurements obtained previously, rather than a single set of measurements.

Optionally, at block 618, the mobile device may report the position fix, e.g., to the network. The position fix including the location of the mobile device may be sent to a networked device such as a server (e.g., location server). In certain scenarios, the position fix may then be used to arrange and provide assistance to the determined location, which has a higher level of accuracy than legacy position fixing (e.g., a location of the mobile device determined without the L5-based qualification described with respect to FIG. 6).

In some embodiments, the WLS-based position fix (without applying a Kalman filter at block 617) may be reported. In some embodiments, a Kalman filter-based position fix (obtained at block 617) may be reported. However, in some cases, if insufficient or too few L1 and L5 measurements are available (e.g., fewer than a threshold number), the Kalman filter may not be initialized. With insufficient measurements, it may be uncertain how accurate the WLS position fix can be, so computational resources are not expended by initializing the Kalman filter. The mobile device may report the WLS-based position fix if a Kalman filter-based position fix is not or cannot be determined. In some implementations, the Kalman filter may be initialized if the quality of the WLS-based fix improves (e.g., the error from block 612 drops below $\text{Err}_m$ or another threshold that is below or above $\text{Err}_m$) or the session is close to timeout (e.g., according to the timeout period in block 604). On the other hand, in some implementations, if the quality of the WLS-based fix does not improve (e.g., the error stays above a threshold), the Kalman filter may be initialized with the WLS-based fix after a certain time period or timeout. In some cases, a certain amount of available computational resources or power may be a prerequisite. This way, improvement of the quality of the position fix using the Kalman filter may be attempted without placing undue computational burden on the mobile device.

However, again, if one or both conditions of the consistency check and the $N_{sv}$ threshold count are not met, or if the session has timed out at block 604, the mobile device may perform legacy fix using just the L1 measurements. Such a legacy-based position fix may be reported, e.g., to the location server, at block 606.

It was empirically observed that positioning performance was improved (based on lower error) in different environmental scenarios such as an open sky and indoor using the enhanced positioning techniques described herein. Hence, using L5 measurements to qualify L1 measurements during tracking can advantageously improve position fixing. In some example scenarios, it can increase the chances of receiving assistance based on the positioning.

Figure 7:
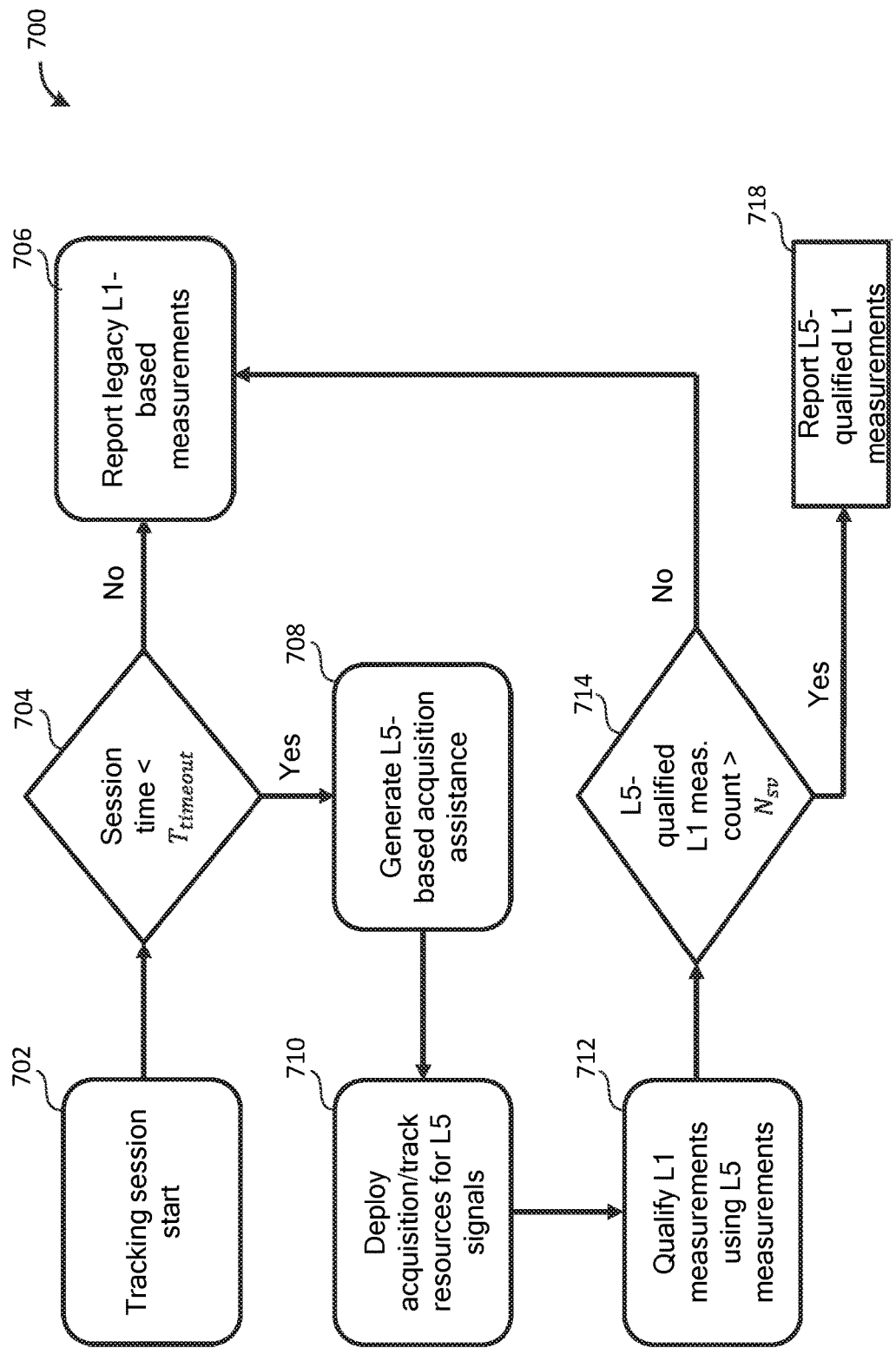
FIG. 7 is a flow diagram of a first process for enhanced positioning of a mobile device by qualifying satellite signal measurements, according to some embodiments.

FIG. 7 is a flow diagram 700 of a first process for enhanced positioning of a mobile device by qualifying satellite signal measurements, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may be in a lower band (e.g., lower bands 420). For example, the first frequency may be a GNSS L1 band, and the second frequency may be a GNSS L5 band.

Structure for performing the functionality illustrated in one or more of the blocks shown in FIG. 7 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 7 may be performed in any suitable order, not necessarily the order depicted in FIG. 7. Further, the process shown in FIG. 7 may include additional or fewer operations than those depicted in FIG. 7.

At block 702, a tracking session may be initiated. In some scenarios, the mobile device may start a mobile-station-assisted (MSA) location determination session in the tracking session, where the position estimation occurs external to the mobile device, e.g., at a network apparatus such as a location server.

In some embodiments, blocks 704 and 708-714 may be similar to blocks 604 and 608-614, and discussion thereof will be omitted for brevity. Since this is a MSA location determination session, at block 706, if the session time has not reached timeout without being able to perform block 708, the mobile device may report measurements using legacy procedure, e.g., send L1-based measurements to the network.

At block 718, the mobile device may send measurements to the network. In some embodiments, the measurements reported to the network may include the L5-qualified L1 measurements (obtained based on, e.g., the consistency check and the satellite count ($N_{sv}$) check according to blocks 612 and 614). In some embodiments, however, the measurements reported to the network may include all L1 measurements (including unqualified L1 measurements) along with L5 measurements and/or information about qualification of L1 measurements (e.g., which L1 measurements are L5-qualified). Having unqualified L1 measurements may allow de-weighting rather than omitting the unqualified L1 measurements altogether. Measurements may include, e.g., pseudorange, receiver time, satellite transmit time, satellite position, satellite velocity and clock parameters, among other information. Reporting to the network may involve sending the measurements to, e.g., a networked apparatus such as a server (e.g., a location server) or another networked apparatus. In some cases, the measurements may be sent to the foregoing locations via intermediary networked devices, including via, e.g., a base station, WLAN AP. The mobile device may send the measurements to a location server, which in turn may send the measurements to another networked apparatus. As another example, the mobile device may send the measurements to an intermediary network entity, which in turn may send the measurements to a location server.

The primary difference between the processes shown in FIGS. 6 and 7 is that the mobile device may determine its own position fix (e.g., in an MSB session) based on obtained L5-qualified L1 measurements in FIG. 6 but the mobile device may report the L5-qualified L1 measurements to another device (e.g., a server) that can determine the position of the mobile device (e.g., in an MSA session) in FIG. 7.

Figure 8:
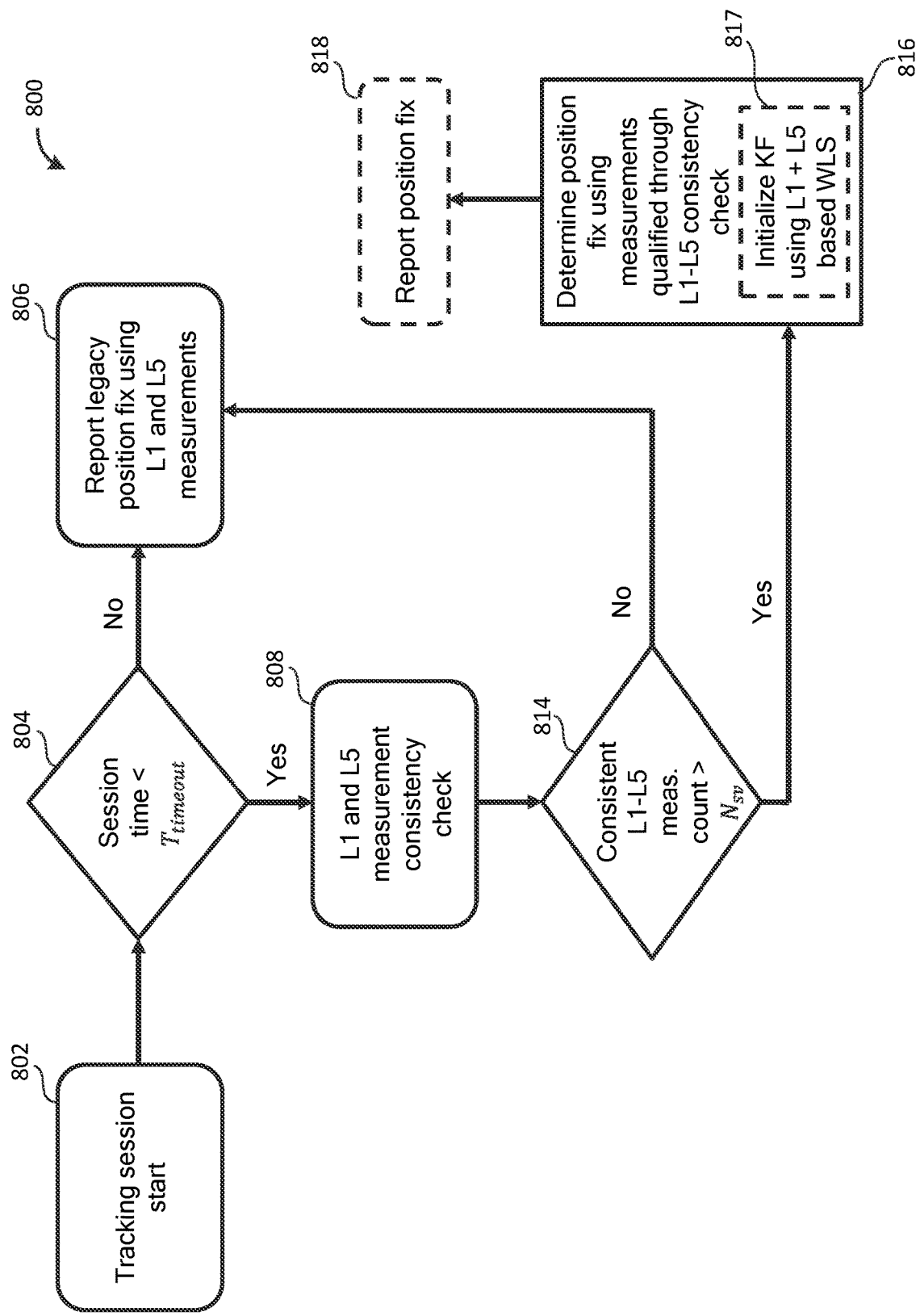
FIG. 8 is a flow diagram of a second process for enhanced positioning of a mobile device by qualifying satellite signal measurements, according to some embodiments.

FIG. 8 is a flow diagram 800 of a second process for enhanced positioning of a mobile device by qualifying satellite signal measurements, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may be in a lower band (e.g., lower bands 420). For example, the first frequency may be a GNSS L1 band, and the second frequency may be a GNSS L5 band.

Structure for performing the functionality illustrated in one or more of the blocks shown in FIG. 8 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 8 may be performed in any suitable order, not necessarily the order depicted in FIG. 8. Further, the process shown in FIG. 8 may include additional or fewer operations than those depicted in FIG. 8.

At block 802, a tracking session may be initiated. In some scenarios, the mobile device may start a mobile-station-based (MSB) location determination session in the tracking session, where the position estimation occurs at the mobile device.

At block 804, the mobile device may determine whether session time for the tracking session has reached a timeout period. An example timeout period for the tracking session may be 20 seconds. Other example timeout periods may be 24 seconds or 60 seconds. The timeout period may provide sufficient time to perform the qualification of satellite measurements as described below.

If the session time has reached timeout without being able to perform the following block 808 (e.g., it has been the length of the timeout period since the start of the tracking session), the mobile device may proceed to report a position fix using legacy procedure at block 806, using L1 and/or L5 measurements to determine a position fix without performing the qualification of satellite measurements as described below.

If the session time has not reached timeout (e.g., the timeout period has not elapsed since the start of the tracking session), the mobile device may, at block 808, perform a consistency check between L1 measurements and L5 measurements obtained by the mobile device. In some embodiments, to be able to perform the consistency check between L1 and L5 measurements, the mobile device may generate L5-based acquisition assistance, and L1 measurements may also be obtained.

In some embodiments, in order to perform the consistency check, the mobile device may use pre-corrected L5 measurements to compare with L1 measurements as a consistency measure. For example, Eqn. 1 discussed above may be used to perform the consistency check. That is, L5 pseudorange measurements corrected by the time bias between L1 and L5 measurements may be compared with corresponding ones of the L1 pseudorange measurements. The differences determined from this comparison, or the error, may then be compared with an error threshold. Pairs of L1 and L5 measurements having a pseudorange difference of less than the error threshold may be considered consistent L1-L5 measurements and considered qualified by the consistency check. A plurality of L1 and L5 measurements may be checked for consistency.

At block 814, the number of consistent measurements may be compared against a threshold number ($N_{sv}$) of space vehicles (e.g., GNSS satellites) chosen to ensure sufficient redundancy for accuracy of the position fix. Here, example $N_{sv}$ thresholds may include more than seven (7) in an open sky environment, more than nine (9) in a semi-urban area, and more than (11) in an urban canyon or another challenging environment. For example, at least eight (8) consistent L1 and L5 measurements (four (4) or more consistent L1-L5 pairs of measurements) would be needed to meet the satellite count check in an open sky environment. Note that the consistent measurements here will necessarily be an even number because L1 and L5 measurements deemed consistent will be in pairs. If the number of consistent measurements is greater than this threshold, it may be indicative of a reliable number of consistent measurements.

At block 816, both L1 and L5 measurements that are consistent may be used to generate the position fix. In some embodiments, the position fix may be determined using the L1 and L5 measurements based on a known weighted least squares (WLS) methodology.

In some variants, L1 and L5 measurements that are not consistent (those that have errors that exceed the error threshold and thus do not pass the consistency check) may be omitted from the positioning determination at block 816. In some variants, the unqualified L1 and L5 measurements may still be used in determining the position fix but de-weighted.

If, according to the comparison to the threshold number $N_{sv}$, the quantity of consistent L1 and L5 measurements do not exceed the threshold number, the mobile device may revert to using legacy positioning (e.g., using a combination of obtained L1 and L5 measurements, or only L1 measurements or only L5 measurements) to obtain the position fix, at block 806.

Optionally, at block 817, in some embodiments, the mobile device may initialize a Kalman filter with the position fix using the L1 and L5 measurements qualified through the consistency measure. After initialization, the Kalman filter may use the consistent L1 and L5 measurements in deriving its solution. In some implementations, the measurements that are not qualified through L1-L5 consistency measure may be de-weighted. A Kalman filter-based position fix may thereby be obtained by the mobile device. Using a Kalman filter may provide a more accurate estimation of the position fix using a series of measurements, e.g., L1 measurements and L5 measurements obtained previously, rather than a single set of measurements.

Optionally, at block 818, the mobile device may report the position fix, e.g., to the network. The position fix including the location of the mobile device may be sent to a networked device such as a server (e.g., location server). The position fix may have a higher level of accuracy than legacy position fixing (e.g., a location of the mobile device determined without the qualification described with respect to FIG. 8).

In some embodiments, the WLS-based position fix (without applying a Kalman filter at block 817) may be reported. In some embodiments, a Kalman filter-based position fix (obtained at block 817) may be reported. However, in some cases, if insufficient or too few L1 and L5 measurements are available (e.g., fewer than a threshold number), the Kalman filter may not be initialized. With insufficient measurements, it may be uncertain how accurate the WLS position fix can be, so computational resources are not expended by initializing the Kalman filter. The mobile device may report the WLS-based position fix if a Kalman filter-based position fix is not or cannot be determined. In some implementations, the Kalman filter may be initialized if the quality of the WLS-based fix improves (e.g., the error from the consistency check drops below $Err_m$ or another threshold that is below or above $Err_m$) or the session is close to timeout (e.g., according to the timeout period in block 804). On the other hand, in some implementations, if the quality of the WLS-based fix does not improve (e.g., the error stays above a threshold), the Kalman filter may be initialized with the WLS-based fix after a certain time period or timeout. In some cases, a certain amount of available computational resources or power may be a prerequisite. This way, improvement of the quality of the position fix using the Kalman filter may be attempted without placing undue computational burden on the mobile device.

Figure 9:
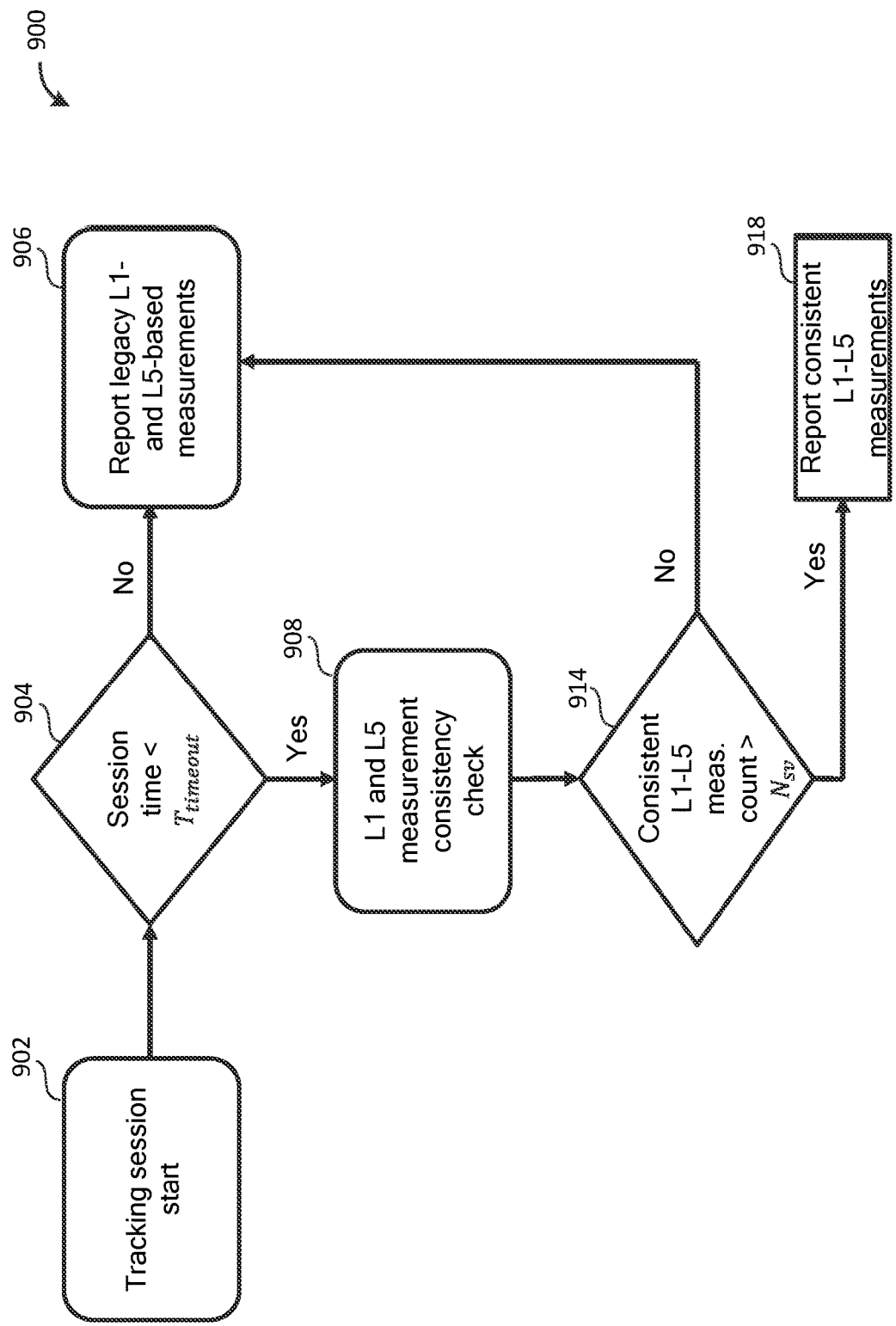
FIG. 9 is a flow diagram of a second process for enhanced positioning of a mobile device by qualifying satellite signal measurements, according to some embodiments.

FIG. 9 is a flow diagram 900 of a second process for enhanced positioning of a mobile device by qualifying satellite signal measurements, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may be in a lower band (e.g., lower bands 420). For example, the first frequency may be a GNSS L1 band, and the second frequency may be a GNSS L5 band.

Structure for performing the functionality illustrated in one or more of the blocks shown in FIG. 9 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 9 may be performed in any suitable order, not necessarily the order depicted in FIG. 9. Further, the process shown in FIG. 9 may include additional or fewer operations than those depicted in FIG. 9.

At block 902, a tracking session may be initiated. In some scenarios, the mobile device may start a mobile-stationassisted (MSA) location determination session in the tracking session, where the position estimation occurs external to the mobile device, e.g., at a network apparatus such as a location server.

In some embodiments, blocks 904, 908 and 914 may be similar to blocks 804, 808 and 814, and discussion thereof will be omitted for brevity. Since this is a MSA location determination session, at block 906, if the session time has reached timeout without being able to perform block 908, the mobile device may report measurements using legacy procedure, e.g., send L1- and L5-based measurements to the network.

At block 918, the mobile device may send measurements to the network. In some embodiments, the measurements reported to the network may include L1 and L5 measurements qualified through the consistency check and the satellite count ($N_{sv}$) check as described above, e.g., with respect to blocks 808 and 814. In some embodiments, however, the measurements reported to the network may include all L1 and L5 measurements (including unqualified L1 and L5 measurements). Information about which pairs of the L1 and L5 measurements are qualified may also be provided. Receiving unqualified measurements may allow de-weighting rather than omitting the unqualified measurements altogether. Measurements may include, e.g., pseudorange, receiver time, satellite transmit time, satellite position, satellite velocity and clock parameters, among other information. Reporting to the network may involve sending the measurements to, e.g., a networked apparatus such as a server (e.g., a location server) or another networked apparatus. In some cases, the measurements may be sent to the foregoing locations via intermediary networked devices, including via, e.g., a base station, WLAN AP.

The primary difference between the processes shown in FIGS. 8 and 9 is that the mobile device may determine its own position fix (e.g., in an MSB session) based on obtained qualified L1 and L5 measurements in FIG. 8 but the mobile device may report the qualified L1 and L5 measurements to another device (e.g., a server) that can determine the position of the mobile device (e.g., in an MSA session) in FIG. 9.

As will be discussed further below with respect to FIG. 10, the server or another access point (e.g., PSAP) may determine a position fix of the mobile device, e.g., using WLS-based and/or Kalman filter-based methodologies discussed above with respect to blocks 616 and/or 617, and report the position fix to other parts of the network. For example, the server may determine the position fix using the measurements received from the mobile device, and report the position fix of the mobile device to another network entity, another mobile device, base station, access point, etc.

Qualification of Satellite Signal Measurements for Power Conservation

L1 measurements may be evaluated and qualified using L5 measurements to obtain a more accurate position fix of a mobile device (compared to, e.g., using all L1 measurements) in tracking sessions as described as above. However, this approach may enable enhanced operation of the mobile device in other scenarios as well. In some aspects, L1 and L5 measurements may be used to save power for ongoing positioning efforts (e.g., navigation) or ongoing tracking sessions (e.g., 1 Hz or every second), thereby increasing power efficiency of the mobile device. In some aspects, position fixes determined using L1 and L5 may be used to save power for such ongoing positioning efforts or ongoing tracking sessions, thereby increasing power efficiency of the mobile device.

Figure 10:
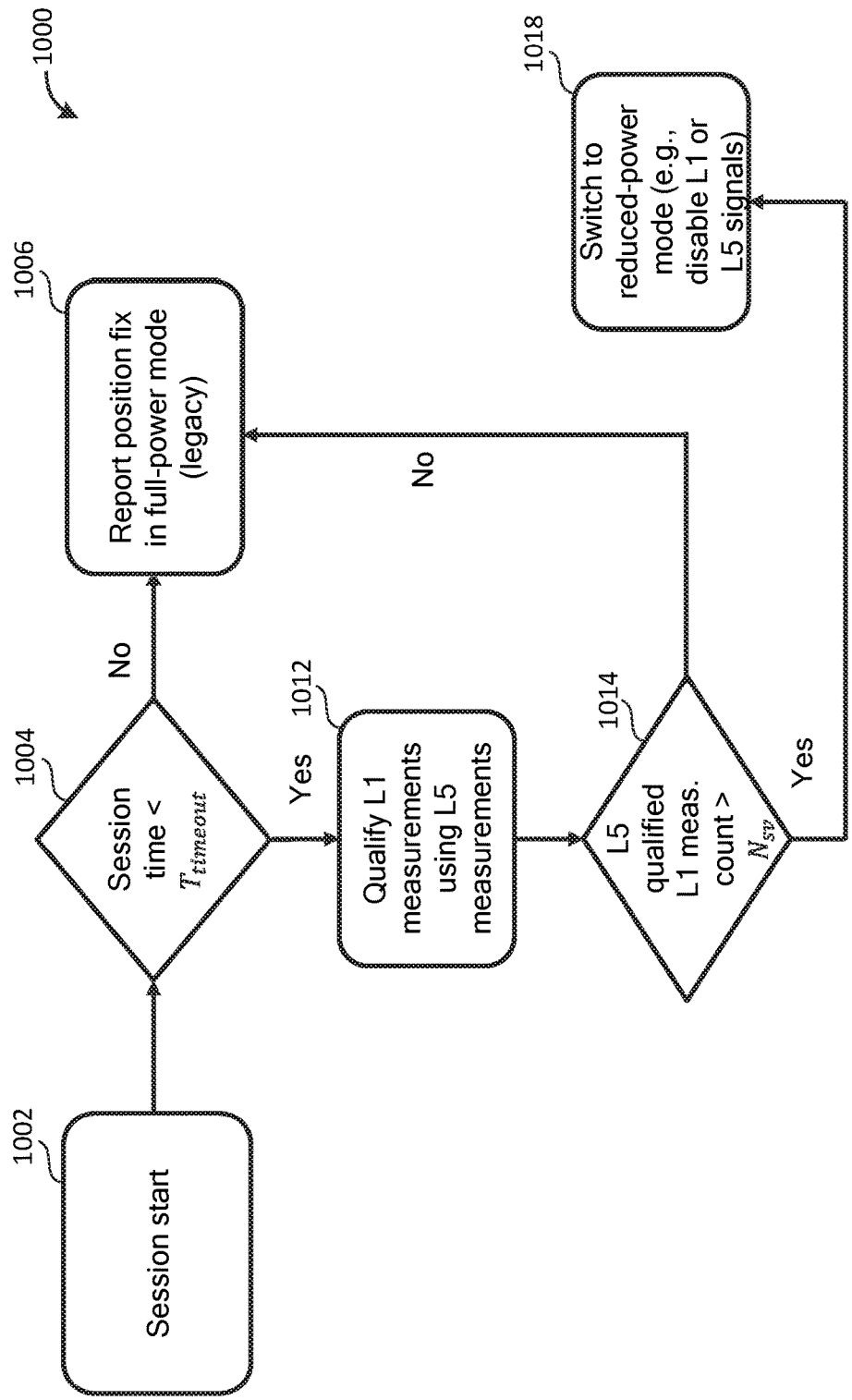
FIG. 10 is a flow diagram of a process for enhanced operation of a mobile device by qualifying satellite signal measurements, according to some embodiments.

FIG. 10 is a flow diagram 1000 of a process for enhanced operation of a mobile device by qualifying satellite signal measurements, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may be in a lower band (e.g., lower bands 420). For example, the first frequency may be a GNSS L1 band, and the second frequency may be a GNSS L5 band.

Structure for performing the functionality illustrated in one or more of the blocks shown in FIG. 10 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 10 may be performed in any suitable order, not necessarily the order depicted in FIG. 10. Further, the process shown in FIG. 10 may include additional or fewer operations than those depicted in FIG. 10.

At block 1002, a session may be initiated. In some scenarios, the session may involve positioning of a mobile device in a scenario that does not restrict use of L5 signals and measurements when determining a position fix of the mobile device.

Optionally, at block 1004, the mobile device may determine whether session time for the session has reached a timeout period. An example timeout period for the for the session may be 20 seconds or up to 60 seconds. In another example, the timeout period may be longer (e.g., more than 60 seconds). In some embodiments, there may not be any timeout period, e.g., if there is no urgency for ongoing positioning or tracking. These longer timeout periods balance the need for enhanced operation (e.g., reduced power usage) and the lack of urgency as compared to a more "on demand" positioning session such as that described with respect to FIGS. 6-9. Various other timeout periods may be selected in different implementations.

If the session time has reached timeout, the mobile device may proceed to determine and/or report position fix using legacy procedure at block 1006. Legacy procedure in the context of FIG. 10 may refer to a default mode of determining a position fix, which normally involves obtaining and using both L1 and L5 measurements which may be more accurate but requires more power than using L1 or L5 measurements alone. Hence, in some example implementations, legacy procedure may involve using both L1 and L5 measurements (which may include unqualified L1 measurements) to obtain the position of the mobile device and/or reporting the same (e.g., to a server or another networked access point).

If the session time has not reached timeout, the mobile device may deploy resources to acquire and track L5 measurements, and at block 1012, qualify the L1 measurements using the L5 measurements to obtain L5-qualified L1 measurements. In some embodiments, the acquisition of L5 measurements may be similar to the operations described with respect to blocks 608 and 610. In some embodiments, qualification of L1 measurements using L5 measurements may be similar to the operations described with respect to block 612, including, e.g., the consistency check represented by Eqn. 1.

At block 1014, the quantity of L5-qualified L1 measurements resulting from the consistency check may be compared to a threshold number ($N_{sv}$) of space vehicles (e.g., GNSS satellites) chosen to ensure sufficient redundancy for accuracy of the position fix, which in some embodiments may be similar to the operations described with respect to block 614.

If, according to the comparison to the threshold number, the quantity of L5-qualified L1 measurements do not exceed the threshold number $N_{sv}$, the mobile device revert to using legacy positioning to obtain the position fix, at block 1006.

On the other hand, at block 1018, if the quantity of L5-qualified L1 measurements exceeds the threshold number, the mobile device may switch to a reduced-power mode. Reduced-power mode may be entered from a normal-power mode or from a low-power mode (e.g., low battery, high temperature), where power usage may be further reduced to enhance operation of the mobile device.

In some embodiments, switching to the reduced-power mode may include turning off L5 to save power, e.g., by disabling hardware configured to receive L5 signals. The disabled hardware may be one of the first RF chain represented by components 502-1 to 514-1, or the second RF chain represented by components 502-2 to 514-2.

In some embodiments, turning off L5 may be based on the L1 measurements and L5 measurements being consistent and the L1 and L5 signals being strong. In some implementations, consistency between L1 and L5 measurements may be evaluated using Eqn. 1 to determine that the difference between pre-corrected (e.g., using $TB_{L1\text{-}L5}$) L5 pseudorange measurements L1 pseudorange measurements is within an error threshold (e.g., $Err_m$). In some implementations, classification of whether the signals are strong or weak may be determined based on statistics derivable from L1-based signal strength (e.g., measured by SNR), and L5-based signal strength, e.g., mean or standard deviation of signal strength, where these statistics may be compared to a threshold, where the statistics being at or above the threshold may indicate that the signals are strong. When signals are consistent and strong, this may indicate that L1 signals are sufficient to obtain an accurate position fix without the less-power-efficient L5 processing, and disabling L5 may advantageously result in power saving.

In some embodiments, switching to the low-power mode may include turning off L1 to save power, e.g., by disabling hardware configured to receive L1 signals. The disabled hardware may be one of the first RF chain represented by components 502-1 to 514-1, or the second RF chain represented by components 502-2 to 514-2. As an illustrative example, turning off L1 may involve disabling the first RF chain, and turning off L5 may involve disabling the second RF chain.

In some embodiments, turning off L1 may be based on the L1 and L5 measurements being inconsistent and the L1 and L5 signals being weak (e.g., low signal strength or SNR, signal loss, non-efficient antenna implementation). In some implementations, inconsistency between L1 and L5 measurements may be evaluated using Eqn. 1 to determine that the difference between pre-corrected (e.g., using $TB_{L1\text{-}L5}$) L5 pseudorange measurements and L1 pseudorange measurements is outside an error threshold (e.g., $Err_m$). In some implementations, determining that the signals are weak may be based on statistics derivable from L1-based SNR and L5-based SNR, e.g., mean or standard deviation of SNR, where these statistics may be compared to a threshold, where the statistics being at or below the threshold may indicate that the signals are weak. When signals are inconsistent and signals are weak, disabling L1 may advantageously result in power saving while retaining the capability to obtain a sufficiently accurate position fix using L5 signals only.

However, if there are too few L5 signals in a challenging or weak signal environment, then the mobile device may switch to a full-power (legacy) mode supporting both L1 and L5 signals (e.g., block 1006), which may allow the mobile device to use as many of the signals as possible (including both L1 and L5 signals) to determine the most accurate position fix given the situation. In some cases, L5 may be disabled if there are too few L5 signals, using L1 only to conserve power. This approach may be useful if. e.g., the mobile device is already in need of power conservation, or the mobile device is already low-power mode indicating that further power savings may be beneficial for the mobile device or its user.

Figure 11:
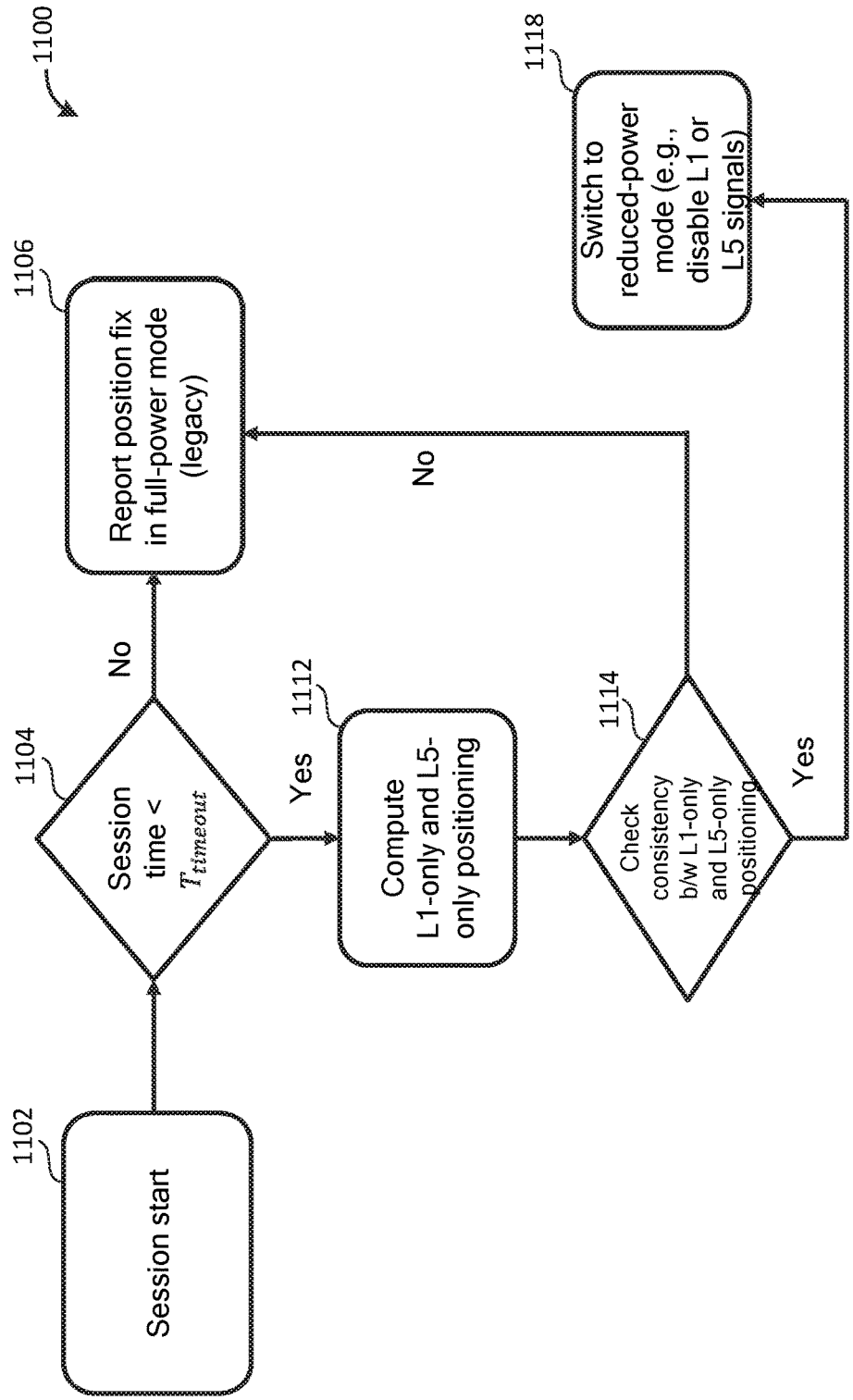
FIG. 11 is a flow diagram of a process for enhanced operation of a mobile device by qualifying satellite signal measurements, according to some embodiments.

FIG. 11 is a flow diagram 1100 of a process for enhanced operation of a mobile device by qualifying satellite signal measurements, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may be in a lower band (e.g., lower bands 420). For example, the first frequency may be a GNSS L1 band, and the second frequency may be a GNSS L5 band.

Structure for performing the functionality illustrated in one or more of the blocks shown in FIG. 11 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 11 may be performed in any suitable order, not necessarily the order depicted in FIG. 11. Further, the process shown in FIG. 11 may include additional or fewer operations than those depicted in FIG. 11.

In some embodiments, blocks 1102-1106 may be similar to blocks 1002-1006, and discussion thereof will be omitted for brevity.

At block 1112, at least one L1-based position fix of the mobile device using L1 measurements only, and at least one L5-based position fix of the mobile device using L5 measurements only may be obtained. An L1-based position fix may be determined using L1 signals only, and an L5-based position fix may be determined using L5 signals only. In some embodiments, the L1-based and L5-based position fixes may each be determined by the mobile device using the WLS methodology mentioned elsewhere herein. In some embodiments, the L1-based position fix and the L5-based position fix may be determined by the network (e.g., location server) using measurements sent to the network by the mobile device, and the mobile device may obtain the position fixes.

At block 1114, a consistency between the L1-based position fix and the L5-based position fix may be checked. In some embodiments, the consistency check between the position fixes may include evaluating a difference or error in distance between the positions. For example, if the difference between the position fixes is below a distance threshold, it may be determined that the L1-based position fix and the L5-based position fix are consistent, and the mobile device may switch to a reduced-power mode at block 1118. In some implementations, the consistency of the positions may be evaluated by the mobile device, whereas in some implementations, it may be evaluated by the network (e.g., location server) and provided to the mobile device.

In some cases, if the L1-based position fix is consistent with the L5-based position fix, and the L1 and L5 signals are strong (e.g., as determined based on statistics (e.g., mean or standard deviation SNR or signal strength) against a threshold as discussed with respect to block 1018), the mobile device may turn off L5 to save power. When positions are consistent and signals are strong, this may indicate that L1 signals are sufficient to obtain an accurate position fix without the less-power-efficient L5 processing, and disabling L5 may advantageously result in power saving.

Otherwise, if the difference between the position fixes is not below a distance threshold, the L1-based position fix and the L5-based position fix may not be considered consistent, and a position fix may be determined and/or reported using legacy procedure at block 1106.

In some cases, if the L1-based position fix is not consistent with the L5-based position, and the L1 and L5 signals are weak (e.g., based on statistics), then L1 may be turned off to save power. When the positioning is inconsistent and signals are weak, disabling L1 may advantageously result in power saving while retaining the capability to obtain a sufficiently accurate position fix using L5 signals only.

However, if the L5-based position fix has an uncertainty that is sufficiently high (e.g., Horizontal Estimated Position Error (HEPE) is above a threshold) in a challenging or weak signal environment, then the mobile device may switch to a full-power (legacy) mode supporting both L1 and L5 signals (e.g., block 1106) so as to determine the most accurate position fix given the situation. In some cases, L5 may be disabled if the L5-bsaed position fix has too large of an error, using L1 only to conserve power. This may be useful where, e.g., the mobile device is already in need of power conservation, e.g., the mobile device is already in low-power mode indicating that further power savings may be beneficial for the mobile device or its user.

As alluded to above, FIG. 10 illustrates a measurement-based evaluation and approach to enhanced operation (e.g., power conservation for the mobile device), while FIG. 11 illustrates a position-based approach.

Methods

Figure 12:
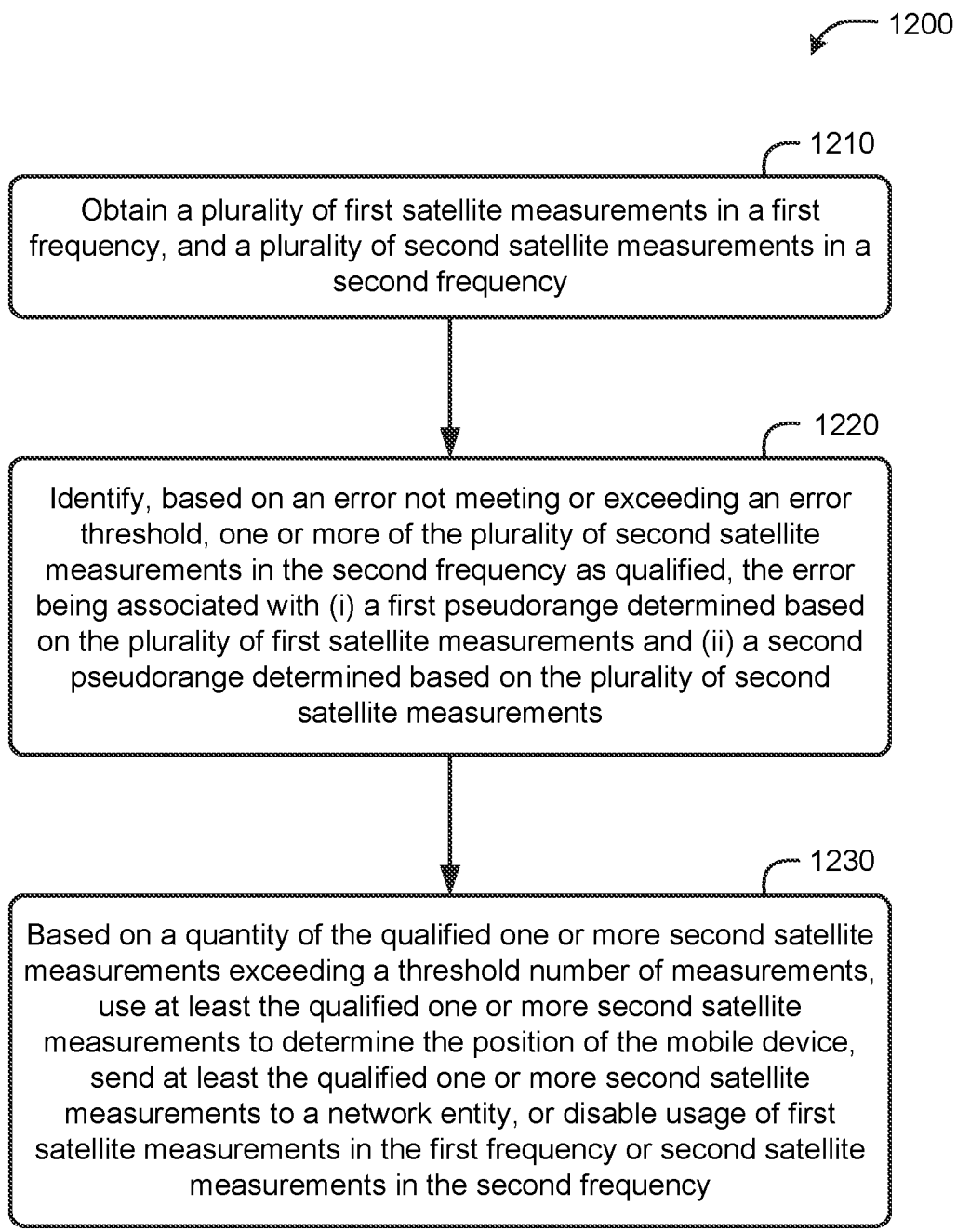
FIG. 12 is a flow diagram of a method for enhanced positioning of a mobile device, according to some embodiments.

FIG. 12 is a flow diagram 1200 of a method for enhanced positioning of a mobile device, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may in a lower band (e.g., lower bands 420). For example, the first frequency may be a GNSS L1 band, and the second frequency may be a GNSS L5 band.

Structure for performing the functionality illustrated in one or more of the blocks shown in FIG. 12 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 12 may be performed in any suitable order, not necessarily the order depicted in FIG. 12. Further, the process shown in FIG. 12 may include additional or fewer operations than those depicted in FIG. 12.

At block 1210, the method may include obtaining (e.g., at the mobile device) a plurality of first satellite measurements in a first frequency, and a plurality of second satellite measurements in a second frequency. In some embodiments, the plurality of first satellite measurements in the first frequency may comprise a plurality of Global Navigation Satellite System (GNSS) L5 measurements, and the plurality of second satellite measurements in the second frequency may comprise a plurality of GNSS L1 measurements. In some embodiments, the first and second satellite measurements may be obtained by processing L5 and L1 satellite signals (received from, e.g., a GPS satellite), e.g., using the signal processing architecture 500.

In some cases, the first and/or second satellite measurements may be obtained during a tracking session. In some cases, the first and/or second satellite measurements may be obtained during normal operation outside a tracking session. Such measurements may be obtained and stored at least temporarily for later potential use (e.g., positioning, determining whether power saving is feasible).

In some embodiments, the mobile device may be configured to determine the position of the mobile device based on the qualified one or more second satellite measurements during an emergency session in which determining the position of the mobile device based on the plurality of first satellite measurements is restricted.

Means for performing the functionality at block 1210 may include a bus 1605, GNSS receiver 1680, GNSS antenna(s) 1682, and/or other components of a mobile device 1600, as illustrated in FIG. 16 and described hereafter. Additionally or alternatively, means for performing the functionality at block 1210 may include one or more components of a GNSS receiver, such as those illustrated in FIG. 5.

At block 1220, the method may include identifying, based on an error not meeting or exceeding an error threshold, one or more of the plurality of second satellite measurements in the second frequency as qualified. In some embodiments, the error may be associated with (i) a first pseudorange determined based on the plurality of first satellite measurements and (ii) a second pseudorange determined based on the plurality of second satellite measurements. In some embodiments, the error may comprise an error between (i) the first pseudorange pre-corrected with a time bias associated with the plurality of first satellite measurements and the plurality of second satellite measurements, and (ii) the second pseudorange. Eqn. 1 may represent the foregoing comparison of the error against the error threshold.

Means for performing the functionality at block 1220 may include processor(s) 1610 and/or other components of a mobile device 1600, as illustrated in FIG. 16 and described hereafter.

At block 1230, the method may include, based on a quantity of the qualified one or more second satellite measurements exceeding a threshold number of measurements, using at least the qualified one or more second satellite measurements to determine the position of the mobile device, sending at least the qualified one or more second satellite measurements to a network entity (e.g., network device), or disabling usage of first satellite measurements in the first frequency or second satellite measurements in the second frequency.

In some embodiments, the threshold number of measurements may be set or selected based at least on a characteristic of an environment associated with the mobile device. The threshold number of measurements may represent a number of space vehicles (e.g., GNSS satellites) chosen to ensure sufficient redundancy for accuracy of the position. For example, more than five (5) L5-qualified L1 measurements may be needed to determine sufficient redundancy ($N_{sv}>5$) in an open sky environment. However, more than nine (9) L5-qualified L1 measurements may be needed for sufficient redundancy in an urban canyon or another challenging environment ($N_{sv}>9$), or more than seven (7) L5-qualified L1 measurements may be needed for sufficient redundancy in a semi-urban area.

In some embodiments, the method may further include identifying one or more of the plurality of second satellite measurements in the second frequency as being unqualified based on: the error meeting or exceeding the error threshold, the quantity of the qualified one or more second satellite measurements not exceeding the threshold number of measurements, or a combination thereof; wherein the determination of the position of the mobile device comprises de-weighting or exclusion of the unqualified one or more second satellite measurements.

In some embodiments, using the qualified one or more second satellite measurements to determine the position of the mobile device may include determining one or more weighted least squares (WLS) values using the qualified one or more second satellite measurements. In some embodiments, the method may further include initializing a Kalman filter with the position of the mobile device using the plurality of first satellite measurements, the plurality of second satellite measurements, or a combination thereof. The mobile device may include a location estimator or positioning engine or module 1614 (e.g., at least a portion of computer-executable instructions implemented by a hardware processor configured to execute the corresponding computer-executable instructions), and may be configured to use the WLS-based and/or Kalman filter-based methodologies discussed with respect to blocks 616 and/or 617 to determine the position of the mobile device.

In some embodiments, the network entity may include a location server. In some cases, such as where usage of some satellite measurements is restricted, the network entity may include a Public Safety Answering Point (PSAP). In some embodiments, the network entity may be configured to determine the position of the mobile device based on the qualified one or more second satellite measurements received at the network entity. In some cases, the network entity may send the qualified one or more second satellite measurements to another network entity (e.g., PSAP or a server).

In some embodiments, disabling usage of the first satellite measurements or the second satellite measurements may be based on: a consistency between at least a pseudorange derived from the plurality of first satellite measurements and at least a pseudorange derived from the qualified one or more second satellite measurements; a strength associated with the plurality of first satellite measurements and a strength associated with the plurality of second satellite measurements; or a combination thereof.

In some embodiments, disabling usage of the first satellite measurements or the second satellite measurements may be based on: a consistency between a position of the mobile device determined based on the plurality of first satellite measurements and a position of the mobile device determined based on the plurality of second satellite measurements; a strength associated with the plurality of first satellite measurements and a strength associated with the plurality of second satellite measurements; or a combination thereof.

Means for performing the functionality at block 1230 may include processor(s) 1610, wireless communication interface 1630, wireless communication antenna(s) 1632, and/or other components of a mobile device 1600, as illustrated in FIG. 16 and described hereafter. Additionally or alternatively, means for performing the functionality at block 1230 may include one or more components of a GNSS receiver, such as those illustrated in FIG. 5.

Figure 13:
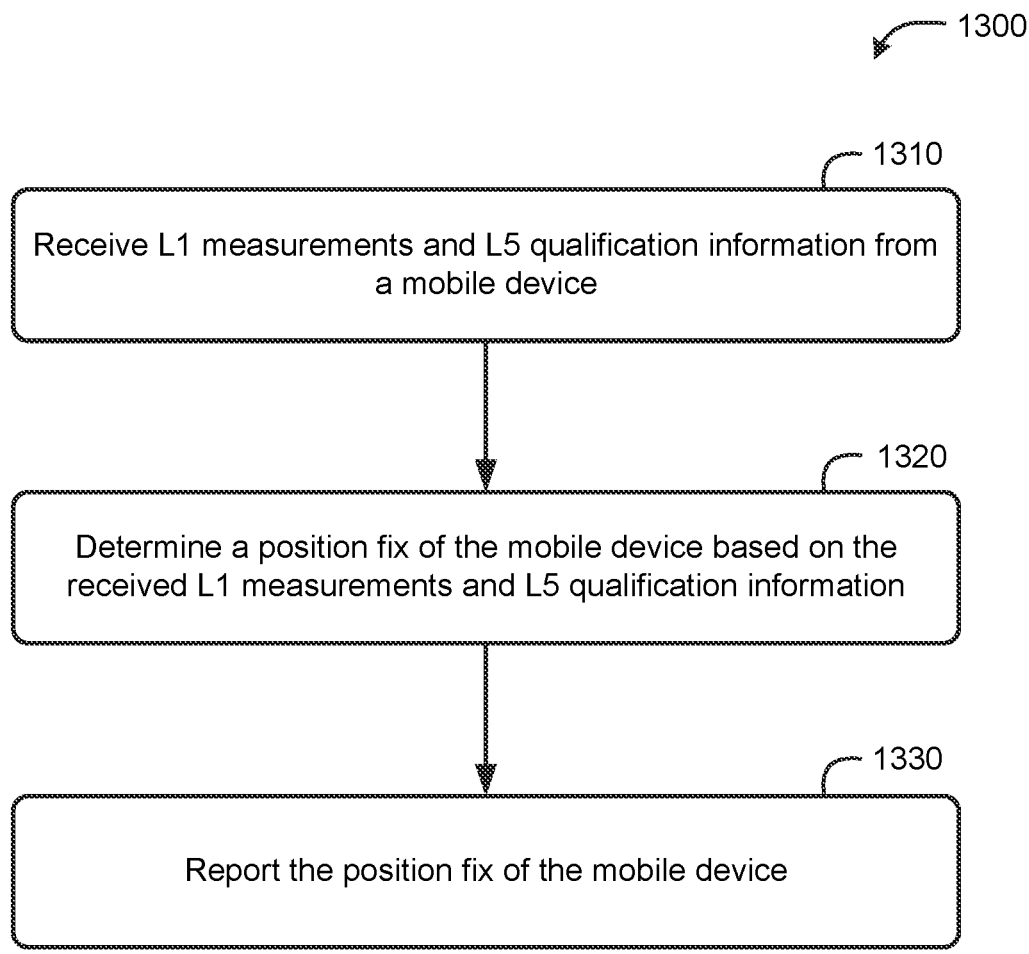
FIG. 13 is a flow diagram of a method for enhanced positioning of a mobile device by a network device, according to some embodiments.

FIG. 13 is a flow diagram 1300 of a method for enhanced positioning of a mobile device by a network device, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may in a lower band (e.g., lower bands 420). For example, the first frequency may be a GNSS L1 band, and the second frequency may be a GNSS L5 band.

Figure 17:
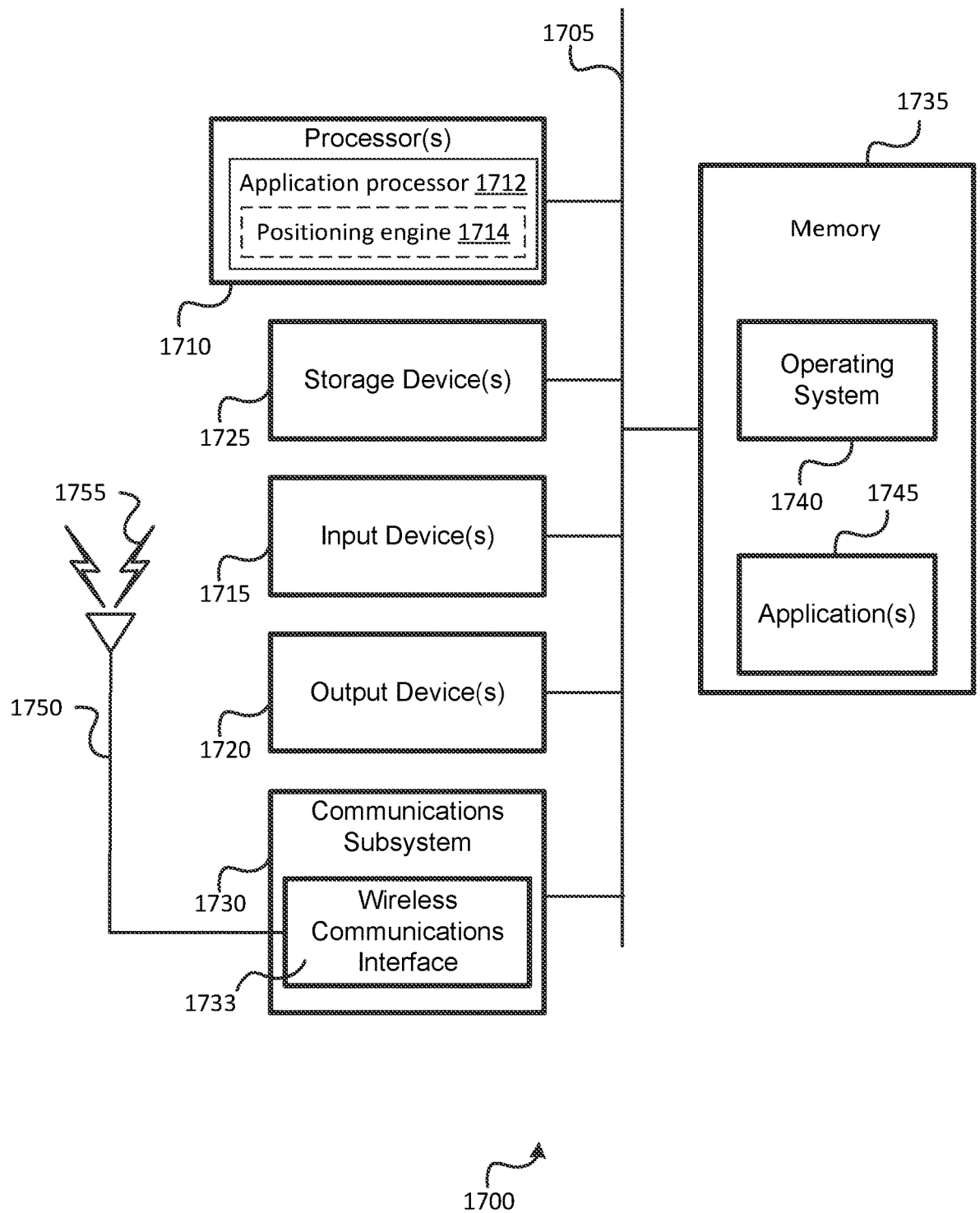
FIG. 17 is a block diagram of an embodiment of a computer system, which can be utilized in embodiments as described herein.

Structure for performing the functionality illustrated in one or more of the blocks shown in FIG. 13 may be performed by hardware and/or software components of a computerized apparatus or system, e.g., a server such as a location server, or another networked apparatus. Components of such computerized apparatus or computer system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computer system (e.g., server) are illustrated in FIG. 17, which are described in more detail below. It should also be noted that the operations of FIG. 13 may be performed in any suitable order, not necessarily the order depicted in FIG. 13. Further, the method shown in FIG. 13 may include additional or fewer operations than those depicted in FIG. 13.

At block 1310, the method may include receiving L1 measurements and L5 qualification information from a mobile device. In some embodiments, L1 measurements may only include L5-qualified L1 measurements obtained by the mobile device according to one or more of blocks 602-614 or blocks 702-714 (including a consistency check and/or a satellite count check). In some embodiments, all L1 measurements (including unqualified L1 measurements) may be received along with L5 measurements and/or information about qualification of L1 measurements (e.g., which L1 measurements are L5-qualified). Qualification here may refer to consistency between L1 and L5 measurements (as determined by, e.g., block 612 or 712) and/or redundancy of measurements (as determined by, e.g., block 614 or 714). Receiving unqualified L1 measurements may allow de-weighting rather than omitting the unqualified L1 measurements altogether. In some implementations, the measurements may be received at a server (e.g., location server) or another networked device. In some cases, the measurements from the mobile device may be received at a PSAP directly or via the server.

Means for performing the functionality at block 1310 may include communications system 1730 and/or other components of a computer system 1700, as illustrated in FIG. 17 and described hereafter.

At block 1320, the method may include determining a position fix of the mobile device based on the received L1 measurements and the L5 qualification information. The receiving server may include a location estimator or positioning engine or module 1714 (e.g., at least a portion of computer-executable instructions implemented by a hardware processor configured to execute the corresponding computer-executable instructions), and may be configured to use WLS-based and/or Kalman filter-based methodologies discussed with respect to blocks 616 and/or 617 to determine the position fix.

Means for performing the functionality at block 1320 may include processor(s) 1710 and/or other components of a computer system 1700, as illustrated in FIG. 17 and described hereafter.

At block 1330, the method may include reporting the position fix of the mobile device. In some cases, the position fix may be sent to other parts of the network: a networked apparatus such as another server, another mobile device, base station, access point, etc. The position fix may have a higher level of accuracy than legacy position fixing (e.g., a location of the mobile device determined without the L5 qualification described herein).

Means for performing the functionality at block 1330 may include communications system 1730 and/or other components of a computer system 1700, as illustrated in FIG. 17 and described hereafter.

Figure 14:
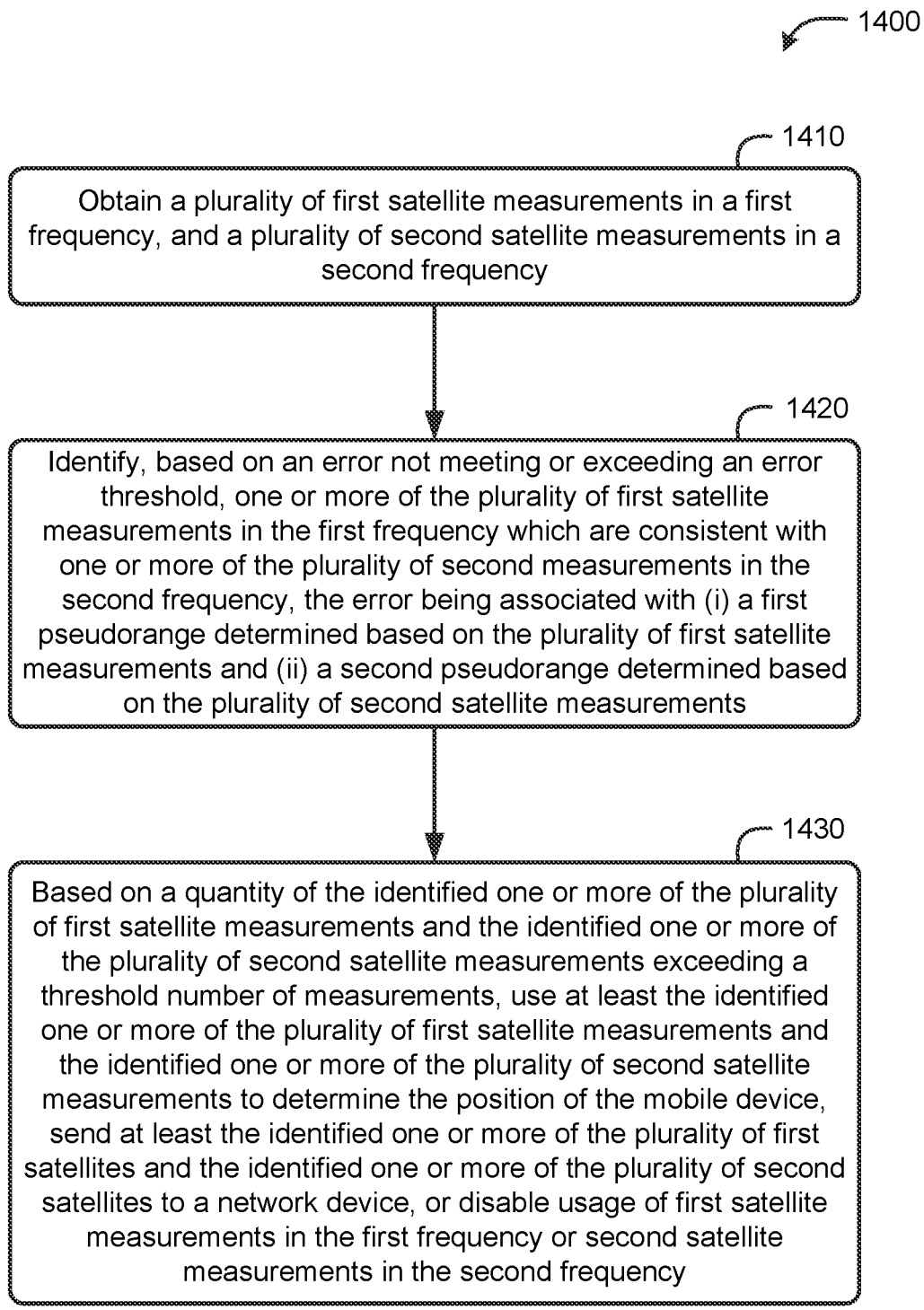
FIG. 14 is a flow diagram of a method for enhanced positioning of a mobile device, according to some embodiments.

FIG. 14 is a flow diagram 1400 of a method for enhanced positioning of a mobile device, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may in a lower band (e.g., lower bands 420). For example, the first frequency may be a GNSS L1 band, and the second frequency may be a GNSS L5 band.

Structure for performing the functionality illustrated in one or more of the blocks shown in FIG. 14 may be performed by hardware and/or software components of a computerized apparatus or system, e.g., a mobile device or other device with a GNSS receiver. Components of such computerized apparatus or system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computerized apparatus (e.g., mobile device) are illustrated in FIG. 16, which are described in more detail below. It should also be noted that the operations of FIG. 14 may be performed in any suitable order, not necessarily the order depicted in FIG. 14. Further, the process shown in FIG. 14 may include additional or fewer operations than those depicted in FIG. 14.

At block 1410, the method may include obtaining (e.g., at the mobile device) a plurality of first satellite measurements in a first frequency, and a plurality of second satellite measurements in a second frequency. In some embodiments, the plurality of first satellite measurements in the first frequency may comprise a plurality of Global Navigation Satellite System (GNSS) L5 measurements, and the plurality of second satellite measurements in the second frequency may comprise a plurality of GNSS L1 measurements. In some embodiments, the first and second satellite measurements may be obtained by processing L5 and L1 satellite signals (received from, e.g., a GPS satellite), e.g., using the signal processing architecture 500.

Means for performing the functionality at block 1410 may include a bus 1605. GNSS receiver 1680, GNSS antenna(s) 1682, and/or other components of a mobile device 1600, as illustrated in FIG. 16 and described hereafter. Additionally or alternatively, means for performing the functionality at block 1410 may include one or more components of a GNSS receiver, such as those illustrated in FIG. 5.

At block 1420, the method may include identifying, based on an error not meeting or exceeding an error threshold, one or more of the plurality of first satellite measurements in the first frequency which are consistent with one or more of the plurality of second measurements in the second frequency. The one or more of the plurality of first satellite measurements in the first frequency may be paired with corresponding one(s) of the one or more of the plurality of second measurements in the second frequency. These pairs of consistent first and second measurements may be considered qualified measurements.

In some embodiments, the error may be associated with (i) a first pseudorange determined based on the plurality of first satellite measurements and (ii) a second pseudorange determined based on the plurality of second satellite measurements. In some embodiments, the error may comprise an error between (i) the first pseudorange pre-corrected with a time bias associated with the plurality of first satellite measurements and the plurality of second satellite measurements, and (ii) the second pseudorange. Eqn. 1 may represent the foregoing comparison of the error against the error threshold.

Means for performing the functionality at block 1420 may include processor(s) 1610 and/or other components of a mobile device 1600, as illustrated in FIG. 16 and described hereafter.

At block 1430, the method may include, based on a quantity of the identified one or more of the plurality of first satellite measurements and the identified one or more of the plurality of second satellite measurements exceeding a threshold number of measurements, using at least the identified one or more of the plurality of first satellite measurements and the identified one or more of the plurality of second satellite measurements to determine the position of the mobile device, sending at least the identified one or more of the plurality of first satellite measurements and the identified one or more of the plurality of second satellite measurements to a network device, or disabling usage of first satellite measurements in the first frequency or second satellite measurements in the second frequency.

In some embodiments, the threshold number of measurements may be set or selected based at least on a characteristic of an environment associated with the mobile device. The threshold number of measurements may represent a number of space vehicles (e.g., GNSS satellites) chosen to ensure sufficient redundancy for accuracy of the position. For example, more than seven (7) consistent L1 and L5 measurements may be needed to determine sufficient redundancy ($N_{sv}>7$) in an open sky environment. That is, eight (8) or more consistent L1 and L5 measurements (four (4) or more consistent L1-L5 pairs of measurements) would be needed to meet the satellite count check in an open sky environment. In other types of environments, such as an urban canyon or another challenging environment, or a semi-urban area, the $N_{sv}$ threshold may be different, e.g., $N_{sv}>11$ in an urban canyon or another challenging environment, or $N_{sv}>9$ in a semi-urban area.

In some embodiments, the method may further include identifying one or more of the plurality of first satellite measurements in the first frequency or one or more of the plurality of second satellite measurements in the second frequency as being unqualified based on: the error meeting or exceeding the error threshold, the quantity of the identified one or more of the plurality of first satellite measurements and the identified one or more of the plurality of second satellite measurements not exceeding the threshold number of measurements, or a combination thereof; wherein the determination of the position of the mobile device comprises de-weighting or exclusion of the unqualified one or more second satellite measurements.

In some embodiments, using the identified one or more of the plurality of first satellite measurements and the identified one or more of the plurality of second satellite measurements to determine the position of the mobile device may include determining one or more weighted least squares (WLS) values using the identified one or more of the plurality of first satellite measurements and the identified one or more of the plurality of second satellite measurements. In some embodiments, the method may further include initializing a Kalman filter with the position of the mobile device using the plurality of first satellite measurements, the plurality of second satellite measurements, or a combination thereof. The mobile device may include a location estimator or positioning engine or module 1614 (e.g., at least a portion of computer-executable instructions implemented by a hardware processor configured to execute the corresponding computer-executable instructions), and may be configured to use the WLS-based and/or Kalman filter-based methodologies discussed with respect to blocks 816 and/or 817 to determine the position of the mobile device.

In some embodiments, the network device may include a location server. In some embodiments, the network device may be configured to determine the position of the mobile device based on the identified one or more of the plurality of first satellite measurements and the identified one or more of the plurality of second satellite measurements received at the network device. In some cases, the network device may send the qualified one or more second satellite measurements to another network device (e.g., an intermediary node or another server).

In some embodiments, disabling usage of the first satellite measurements or the second satellite measurements may be based on: a consistency between at least a pseudorange derived from the plurality of first satellite measurements and at least a pseudorange derived from the qualified one or more second satellite measurements; a strength associated with the plurality of first satellite measurements and a strength associated with the plurality of second satellite measurements; or a combination thereof.

In some embodiments, disabling usage of the first satellite measurements or the second satellite measurements may be based on: a consistency between a position of the mobile device determined based on the plurality of first satellite measurements and a position of the mobile device determined based on the plurality of second satellite measurements; a strength associated with the plurality of first satellite measurements and a strength associated with the plurality of second satellite measurements; or a combination thereof.

Means for performing the functionality at block 1430 may include processor(s) 1610, wireless communication interface 1630, wireless communication antenna(s) 1632, and/or other components of a mobile device 1600, as illustrated in FIG. 16 and described hereafter. Additionally or alternatively, means for performing the functionality at block 1230 may include one or more components of a GNSS receiver, such as those illustrated in FIG. 5.

Figure 15:
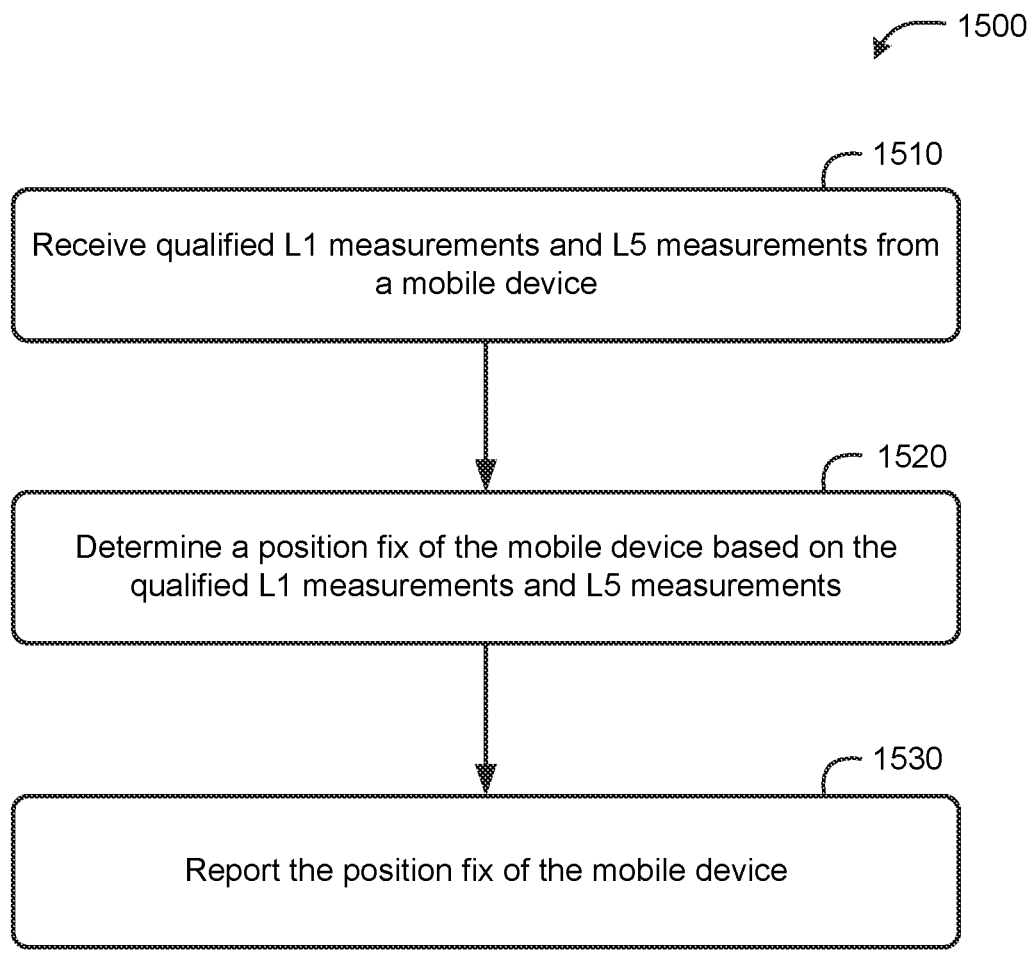
FIG. 15 is a flow diagram of a method for enhanced positioning of a mobile device by a network device, according to some embodiments.

FIG. 15 is a flow diagram 1500 of a method for enhanced positioning of a mobile device by a network device, according to some embodiments. In some embodiments, the enhanced positioning may use satellite measurements in a first frequency, which may be in an upper band (e.g., upper bands 410), and the satellite measurements in the first frequency may be qualified using satellite measurements in a second frequency, where the second frequency may in a lower band (e.g., lower bands 420). For example, the first frequency may be a GNSS L1 band, and the second frequency may be a GNSS L5 band.

Structure for performing the functionality illustrated in one or more of the blocks shown in FIG. 15 may be performed by hardware and/or software components of a computerized apparatus or system, e.g., a server such as a location server, or another networked apparatus. Components of such computerized apparatus or computer system may include, for example, a receiver or transceiver, one or more processors, and a computer-readable apparatus including a storage medium storing computer-readable and/or computer-executable instructions that are configured to, when executed by one or more processors, cause the one or more processors or the computerized apparatus to perform operations represented by blocks below. Example components of the computer system (e.g., server) are illustrated in FIG. 17, which are described in more detail below. It63houldd also be noted that the operations of FIG. 15 may be performed in any suitable order, not necessarily the order depicted in FIG. 15. Further, the method shown in FIG. 15 may include additional or fewer operations than those depicted in FIG. 15.

At block 1510, the method may include receiving qualified L1 measurements and L5 measurements from a mobile device. In some embodiments, the L1 measurements and L5 measurements may only include qualified measurements obtained by the mobile device according to one or more blocks 802-814 or blocks 902-914 (including a consistency check and/or a satellite count check). In some embodiments, all L1 measurements (including unqualified L1 measurements) and all L5 measurements (including unqualified L5 measurements) and/or information about qualification of the L1 and L5 measurements may be received (e.g., which L1 and L5 measurements are qualified). Qualification here may refer to consistency between L1 and L5 measurements (as determined by, e.g., block 808 or 908) and/or redundancy of measurements (as determined by, e.g., block 814 or 914).

Hence, the received L1 and L5 measurements may be in L1-L5 pairs. Receiving unqualified L1 and L5 measurements may allow de-weighting rather than omitting the unqualified L1 and L5 measurements altogether. In some implementations, the measurements may be received at a server (e.g., location server) or another networked device.

Means for performing the functionality at block 1510 may include communications system 1730 and/or other components of a computer system 1700, as illustrated in FIG. 17 and described hereafter.

At block 1520, the method may include determining a position fix of the mobile device based on the qualified L1 measurements and L5 measurements. The receiving server may include a location estimator or positioning engine or module 1714 (e.g., at least a portion of computer-executable instructions implemented by a hardware processor configured to execute the corresponding computer-executable instructions), and may be configured to use WLS-based and/or Kalman filter-based methodologies discussed with respect to blocks 816 and/or 817 to determine the position fix.

Means for performing the functionality at block 1520 may include processor(s) 1710 and/or other components of a computer system 1700, as illustrated in FIG. 17 and described hereafter.

At block 1530, the method may include reporting the position fix of the mobile device. In some cases, the position fix may be sent to other parts of the network: a networked apparatus such as another server, another mobile device, base station, access point, etc. The position fix may have a higher level of accuracy than legacy position fixing (e.g., a location of the mobile device determined without the qualification described herein).

Apparatus

FIG. 16 is a block diagram of an embodiment of a mobile device 1600, which can be utilized as described herein above (e.g., in association with FIGS. 1-12). For example, the mobile device 1600 can corresponds to mobile device 105 of FIG. 1, and may comprise a GNSS receiver and application processor as described herein. It should be noted that FIG. 16 is meant only to provide a generalized illustration of various components, any or all of which may be utilized as appropriate. In other words, because mobile devices can vary widely in functionality, they may include only a portion of the components shown in FIG. 16. It can be noted that, in some instances, components illustrated by FIG. 16 can be localized to a single physical device and/or distributed among various networked devices, which may be disposed at different physical locations.

The mobile device 1600 is shown comprising hardware elements that can be electrically coupled via a bus 1605 (or may otherwise be in communication, as appropriate). The hardware elements may include a processor(s) 1610 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1610 may comprise one or more processing units, which may be housed in a single integrated circuit (IC) or multiple ICs. Processor(s) 1610 may further comprise an application processor 1612, as described in the embodiments above, which may execute a positioning engine 1614. As noted, the positioning engine 1614 may use a GNSS position fix from the GNSS receiver 1680 and/or information from other positioning sources (e.g., sensors 1640) to determine a location of the mobile device 1600. As shown in FIG. 16, some embodiments may have a separate DSP 1620, depending on desired functionality. Location determination and/or other determinations based on wireless communication may be provided in the processor(s) 1610 and/or wireless communication interface 1630 (discussed below). The mobile device 1600 also can include one or more input devices 1670, which can include without limitation one or more keyboards, touch screens, touch pads, microphones, buttons, dials, switches, and/or the like; and one or more output devices 1615, which can include without limitation one or more displays (e.g., touch screens), light emitting diodes (LEDs), speakers, and/or the like.

The mobile device 1600 may also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a WAN device, and/or various cellular devices, etc.), and/or the like, which may enable the mobile device 1600 to communicate with other devices as described in the embodiments above. The wireless communication interface 1630 may permit data and signaling to be communicated (e.g., transmitted and received) with, for example, base stations, access points, and/or other access node types, and/or other network components, computer systems, and/or any other electronic devices communicatively coupled a wireless communication network. The communication can be carried out via one or more wireless communication antenna(s) 1632 that send and/or receive wireless signals 1634. According to some embodiments, the wireless communication antenna(s) 1632 may comprise a plurality of discrete antennas, antenna arrays, or any combination thereof. The antenna(s) 1632 may be capable of transmitting and receiving wireless signals using beams (e.g., Tx beams and Rx beams). Beam formation may be performed using digital and/or analog beam formation techniques, with respective digital and/or analog circuitry. The wireless communication interface 1630 may include such circuitry.

Depending on desired functionality, the wireless communication interface 1630 may comprise a separate receiver and transmitter, or any combination of transceivers, transmitters, and/or receivers to communicate with base stations and other terrestrial transceivers, such as wireless devices and access points. The mobile device 1600 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1600 can further include sensor(s) 1640. Sensor(s) 1640 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used as positioning data sources and/or to obtain other position-related measurements and/or other information.

Embodiments of the mobile device 1600 may also include a GNSS receiver 1680 capable of receiving signals 1684 from one or more GNSS satellites via one or more GNSS bands using GNSS antenna(s) 1682. The GNSS receiver 1680 of FIG. 16 may correspond to the GNSS receiver described in previous embodiments, including the GNSS receiver 400 of FIG. 4. and as such, the GNSS receiver 1680 of FIG. 16 may comprise components illustrated in FIG. 4 and described above. The GNSS receiver 1680 may therefore be used to provide GNSS position fixes based on received GNSS signals 1684 using, for example, the signal processing architecture 400 of FIG. 4 and/or similar processing components. The GNSS receiver 1680 may be capable of processing signals received via many GNSS bands/constellations. In some embodiments, the GNSS receiver 1680 may include front-end analog components for each GNSS band (or for pairs of GNSS bands having similar baseband frequencies), and may share digital circuitry (e.g., complex down-conversion and digital baseband 416 of FIG. 4) among multiple GNSS bands. Additionally or alternatively, digital circuitry may be separate for each GNSS band. The GNSS receiver 1680 may communicate with other components of the mobile device 1600 (e.g., processor(s) 1610, including application processor 1612 and/or positioning engine 1614) via a data interface with the bus 1605.

The GNSS receiver 1680 can extract a position of the mobile device 1600, using conventional techniques, from GNSS satellites 110 of a GNSS system, such as GPS, Galileo, GLONASS, Quasi-Zenith Satellite System (QZSS) over Japan, IRNSS over India, BeiDou Navigation Satellite System (BDS) over China, and/or the like. Moreover, the GNSS receiver 1680 can be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

It can be noted that, although GNSS receiver 1680 is illustrated in FIG. 16 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1610, DSP 1620, and/or a processor within the wireless communication interface 1630 (e.g., in a modem). A GNSS receiver may optionally also include a GNSS positioning engine, which can use GNSS measurements from the measurement engine to determine a position of the GNSS receiver (e.g., a position fix) using an Extended Kalman Filter (EKF), Weighted Least Squares (WLS), a hatch filter, particle filter, or the like. The GNSS positioning engine may also be executed as part of a larger processing engine e.g., positioning engine 1614 executed by application processor 1612.

The mobile device 1600 may further include and/or be in communication with a memory 1660. The memory 1660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1660 of the mobile device 1600 also can comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above may be implemented as code and/or instructions executable by the mobile device 1600 (e.g., using processor(s) 1610). In some embodiments, then, such code and/or instructions can be used to configure and/or adapt a general-purpose computer (or other device) to perform one or more operations in accordance with the described methods.

FIG. 17 is a block diagram of an embodiment of a computer system 1700, which may be used, in whole or in part, to provide the functions of one or more network components as described in the embodiments herein, e.g., in association with FIG. 13. A server (e.g., location server) or a Public Safety Answering Point (PSAP) may be an example of the computer system 1700. It should be noted that FIG. 17 is meant only to provide a generalized illustration of various components, any or all of which may be utilized as appropriate. FIG. 17, therefore, broadly illustrates how individual system elements may be implemented in a relatively separated or relatively more integrated manner. In addition, it can be noted that components illustrated by FIG. 17 can be localized to a single device and/or distributed among various networked devices, which may be disposed at different geographical locations.

The computer system 1700 is shown comprising hardware elements that can be electrically coupled via a bus 1705 (or may otherwise be in communication, as appropriate). The hardware elements may include processor(s) 1710, which may comprise without limitation one or more general-purpose processors, one or more special-purpose processors (such as digital signal processing chips, graphics acceleration processors, and/or the like), and/or other processing structure, which can be configured to perform one or more of the methods described herein. Processor(s) 1710 may further comprise an application processor 1712, as described in the embodiments above, which may execute a positioning engine 1714. The positioning engine 1714 may use a GNSS position fix from information such as measurements and/or other information from other positioning sources (e.g., mobile device 1600) to determine a location of the mobile device 1600. The computer system 1700 also may comprise one or more input devices 1715, which may comprise without limitation a mouse, a keyboard, a camera, a microphone, and/or the like; and one or more output devices 1720, which may comprise without limitation a display device, a printer, and/or the like.

The computer system 1700 may further include (and/or be in communication with) one or more non-transitory storage devices 1725, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1700 may also include a communications subsystem 1730, which may comprise wireless communication technologies managed and controlled by a wireless communication interface 1733, a UWB communications interface 1734, as well as wired technologies (such as Ethernet, coaxial communications, universal serial bus (USB), and the like). The wireless communication interface 1733 may comprise one or more wireless transceivers that may send and receive wireless signals 1755 (e.g., signals according to 5G NR or LTE) via wireless antenna(s) 1750. The UWB communications interface 1734 may be coupled to the wireless antenna(s) 1750 to send signals and data in the UWB (e.g., over about 499.2 MHz). Thus the communications subsystem 1730 may comprise a modem, a network card (wireless or wired), an infrared communication device, a wireless communication device, and/or a chipset, and/or the like, which may enable the computer system 1700 to communicate on any or all of the communication networks described herein to any device on the respective network, including a mobile device, base stations and/or other TRPs, and/or any other electronic devices described herein. Hence, the communications subsystem 1730 may be used to receive and send data as described in the embodiments herein.

In many embodiments, the computer system 1700 will further comprise a working memory 1735, which may comprise a RAM or ROM device, as described above. Software elements, shown as being located within the working memory 1735, may comprise an operating system 1740, device drivers, executable libraries, and/or other code, such as one or more applications 1745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of satellite-based determination of a position of a mobile device, the method comprising: obtaining a plurality of first satellite measurements in a first frequency, and a plurality of second satellite measurements in a second frequency; identifying, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and based on a quantity of the qualified one or more second satellite measurements exceeding a threshold number of measurements, using at least the qualified one or more second satellite measurements to determine the position of the mobile device, sending at least the qualified one or more second satellite measurements to a network device, or disabling usage of first satellite measurements in the first frequency or second satellite measurements in the second frequency.

Clause 2. The method of clause 1, wherein: the plurality of first satellite measurements in the first frequency comprise a plurality of Global Navigation Satellite System (GNSS) L5 measurements; and the plurality of second satellite measurements in the second frequency comprise a plurality of GNSS L1 measurements.

Clause 3. The method of any one of clauses 1-2 wherein the network device is configured to determine the position of the mobile device based on the qualified one or more second satellite measurements received at the network device.

Clause 4. The method of any one of clauses 1-3 wherein the error comprises an error between (i) the first pseudorange pre-corrected with a time bias associated with the plurality of first satellite measurements and the plurality of second satellite measurements, and (ii) the second pseudorange.

Clause 5. The method of any one of clauses 1-4 wherein the threshold number of measurements is set based at least on a characteristic of an environment associated with the mobile device.

Clause 6. The method of any one of clauses 1-5 further comprising identifying one or more of the plurality of second satellite measurements in the second frequency as being unqualified based on: the error meeting or exceeding the error threshold, the quantity of the qualified one or more second satellite measurements not exceeding the threshold number of measurements, or a combination thereof; wherein the determination of the position of the mobile device comprises de-weighting or exclusion of the unqualified one or more second satellite measurements.

Clause 7. The method of any one of clauses 1-6 wherein usage of at least the qualified one or more second satellite measurements to determine the position of the mobile device comprises determination of one or more weighted least squares values using the qualified one or more second satellite measurements.

Clause 8. The method of any one of clauses 1-7 further comprising initializing a Kalman filter with the position of the mobile device using the plurality of first satellite measurements, the plurality of second satellite measurements, or a combination thereof.

Clause 9. The method of any one of clauses 1-8 wherein disabling usage of the first satellite measurements or the second satellite measurements is based on: a consistency between at least a pseudorange derived from the plurality of first satellite measurements and at least a pseudorange derived from the qualified one or more second satellite measurements; a strength associated with the plurality of first satellite measurements and a strength associated with the plurality of second satellite measurements; or a combination thereof.

Clause 10. The method of any one of clauses 1-9 wherein disabling usage of the first satellite measurements or the second satellite measurements is based on: a consistency between a position of the mobile device determined based on the plurality of first satellite measurements and a position of the mobile device determined based on the plurality of second satellite measurements; a strength associated with the plurality of first satellite measurements and a strength associated with the plurality of second satellite measurements; or a combination thereof.

Clause 11. The method of any one of clauses 1-10 wherein the network device comprises a location server.

Clause 12. A mobile device comprising: one or more Global Navigation Satellite System (GNSS) receivers; one or more memory; and one or more processors communicatively coupled to the one or more GNSS receivers and the one or more memory, and configured to: obtain a plurality of first satellite measurements in a first frequency, and a plurality of second satellite measurements in a second frequency; identify, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and based on a quantity of the qualified one or more second satellite measurements exceeding a threshold number of measurements, use at least the qualified one or more second satellite measurements to determine a position of the mobile device, send at least the qualified one or more second satellite measurements to a network device, or disable usage of first satellite measurements in the first frequency or second satellite measurements in the second frequency.

Clause 13. The mobile device of 12, wherein: the plurality of first satellite measurements in the first frequency comprise a plurality of GNSS L5 measurements; and the plurality of second satellite measurements in the second frequency comprise a plurality of GNSS L1 measurements.

Clause 14. The mobile device of 12, wherein the network device is configured to determine the position of the mobile device based on the qualified one or more second satellite measurements received at the network device.

Clause 15. The mobile device of 12, wherein the error comprises an error between (i) the first pseudorange pre-corrected with a time bias associated with the plurality of first satellite measurements and the plurality of second satellite measurements, and (ii) the second pseudorange.

Clause 16. The mobile device of 12, wherein the threshold number of measurements is set based at least on a characteristic of an environment associated with the mobile device.

Clause 17. The mobile device of 12, wherein the one or more processors are further configured to identify one or more of the plurality of second satellite measurements in the second frequency as being unqualified based on: the error meeting or exceeding the error threshold, the quantity of the qualified one or more second satellite measurements not exceeding the threshold number of measurements, or a combination thereof; and wherein the determination of the position of the mobile device comprises de-weighting or exclusion of the unqualified one or more second satellite measurements.

Clause 18. The mobile device of 12, wherein usage of at least the qualified one or more second satellite measurements to determine the position of the mobile device comprises determination of one or more weighted least squares values using the qualified one or more second satellite measurements.

Clause 19. The mobile device of 18, wherein the one or more processors are further configured to initialize a Kalman filter with the position of the mobile device using the plurality of first satellite measurements, the plurality of second satellite measurements, or a combination thereof.

Clause 20. The mobile device of 12, wherein disabling usage of the first satellite measurements or the second satellite measurements is based on: a consistency between at least a pseudorange derived from the plurality of first satellite measurements and at least a pseudorange derived from the qualified one or more second satellite measurements; a strength associated with the plurality of first satellite measurements and a strength associated with the plurality of second satellite measurements; or a combination thereof.

Clause 21. The mobile device of 12, wherein disabling usage of the first satellite measurements or the second satellite measurements is based on: a consistency between a position of the mobile device determined based on the plurality of first satellite measurements and a position of the mobile device determined based on the plurality of second satellite measurements; a strength associated with the plurality of first satellite measurements and a strength associated with the plurality of second satellite measurements; or a combination thereof.

Clause 22. An apparatus comprising: means for obtaining a plurality of first satellite measurements in a first frequency, and a plurality of second satellite measurements in a second frequency; means for identifying, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and means for, based on a quantity of the qualified one or more second satellite measurements exceeding a threshold number of measurements, using at least the qualified one or more second satellite measurements to determine a position of the apparatus, sending at least the qualified one or more second satellite measurements to a network device, or disabling usage of first satellite measurements in the first frequency or second satellite measurements in the second frequency.

Clause 23. The apparatus of clause 22, wherein: the plurality of first satellite measurements in the first frequency comprise a plurality of Global Navigation Satellite System (GNSS) L5 measurements; and the plurality of second satellite measurements in the second frequency comprise a plurality of GNSS L1 measurements.

Clause 24. The apparatus of any one of clauses 22-23 wherein the network device is configured to determine the position of the apparatus based on the qualified one or more second satellite measurements received at the network device.

Clause 25. The apparatus of any one of clauses 22-24 wherein the error comprises an error between (i) the first pseudorange pre-corrected with a time bias associated with the plurality of first satellite measurements and the plurality of second satellite measurements, and (ii) the second pseudorange; and the threshold number of measurements is set based at least on a characteristic of an environment associated with the apparatus.

Clause 26. The apparatus of any one of clauses 22-25 wherein disabling usage of the first satellite measurements or the second satellite measurements is based on: a consistency between at least a pseudorange derived from the plurality of first satellite measurements and at least a pseudorange derived from the qualified one or more second satellite measurements; a strength associated with the plurality of first satellite measurements and a strength associated with the plurality of second satellite measurements; or a combination thereof.

Clause 27. The apparatus of any one of clauses 22-26 wherein disabling usage of the first satellite measurements or the second satellite measurements is based on: a consistency between a position of the apparatus determined based on the plurality of first satellite measurements and a position of the apparatus determined based on the plurality of second satellite measurements; a strength associated with the plurality of first satellite measurements and a strength associated with the plurality of second satellite measurements; or a combination thereof.

Clause 28. A non-transitory computer-readable apparatus comprising a storage medium, the storage medium comprising a plurality of instructions configured to, when executed by one or more processors, cause a mobile device to: obtain a plurality of first satellite measurements in a first frequency, and a plurality of second satellite measurements in a second frequency; identify, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and based on a quantity of the qualified one or more second satellite measurements exceeding a threshold number of measurements, use at least the qualified one or more second satellite measurements to determine a position of the mobile device, send at least the qualified one or more second satellite measurements to a network device, or disable usage of first satellite measurements in the first frequency or second satellite measurements in the second frequency.

Clause 29. The non-transitory computer-readable apparatus of clause 28, wherein: the error comprises an error between (i) the first pseudorange pre-corrected with a time bias associated with the plurality of first satellite measurements and the plurality of second satellite measurements, and (ii) the second pseudorange; and the threshold number of measurements is set based at least on a characteristic of an environment associated with the mobile device.

Clause 30. The non-transitory computer-readable apparatus of any one of clauses 28-29 wherein disabling usage of the first satellite measurements or the second satellite measurements is based on: a consistency between at least a pseudorange derived from the plurality of first satellite measurements and at least a pseudorange derived from the qualified one or more second satellite measurements; a strength associated with the plurality of first satellite measurements and a strength associated with the plurality of second satellite measurements; or a combination thereof.

What is claimed is:

1. A method of satellite-based determination of a position of a mobile device, the method comprising:
    obtaining a plurality of first satellite measurements in a first frequency, and a plurality of second satellite measurements in a second frequency;
    identifying, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and
    based on a quantity of the qualified one or more second satellite measurements exceeding a threshold number of measurements, using at least the qualified one or more second satellite measurements to determine the position of the mobile device, sending at least the qualified one or more second satellite measurements to a network device, or disabling usage of the first satellite measurements in the first frequency or the second satellite measurements in the second frequency, wherein the threshold number of measurements is set based at least on a characteristic of an environment associated with the mobile device.

2. The method of claim 1, wherein:
the plurality of first satellite measurements in the first frequency comprise a plurality of Global Navigation Satellite System (GNSS) L5 measurements; and the plurality of second satellite measurements in the second frequency comprise a plurality of GNSS L1 measurements.

3. The method of claim 1, wherein the network device is configured to determine the position of the mobile device based on the qualified one or more second satellite measurements received at the network device.

4. The method of claim 1, wherein the error comprises an error between (i) the first pseudorange pre-corrected with a time bias associated with the plurality of first satellite measurements and the plurality of second satellite measurements, and (ii) the second pseudorange.

5. The method of claim 1, further comprising identifying one or more of the plurality of second satellite measurements in the second frequency as being unqualified based on: the error meeting or exceeding the error threshold, the quantity of the qualified one or more second satellite measurements not exceeding the threshold number of measurements, or a combination thereof;
    wherein the determination of the position of the mobile device comprises de-weighting or exclusion of the unqualified one or more second satellite measurements.

6. The method of claim 1, wherein usage of at least the qualified one or more second satellite measurements to determine the position of the mobile device comprises determination of one or more weighted least squares values using the qualified one or more second satellite measurements.

7. The method of claim 6, further comprising initializing a Kalman filter with the position of the mobile device using the plurality of first satellite measurements, the plurality of second satellite measurements, or a combination thereof.

8. The method of claim 1, wherein disabling usage of the first satellite measurements or the second satellite measurements is based on:
    a consistency between at least a pseudorange derived from the plurality of first satellite measurements and at least a pseudorange derived from the qualified one or more second satellite measurements;
    a strength associated with the plurality of first satellite measurements and a strength associated with the plurality of second satellite measurements; or
    a combination thereof.

9. The method of claim 1, wherein disabling usage of the first satellite measurements or the second satellite measurements is based on:
    a consistency between a position of the mobile device determined based on the plurality of first satellite measurements and a position of the mobile device determined based on the plurality of second satellite measurements;
    a strength associated with the plurality of first satellite measurements and a strength associated with the plurality of second satellite measurements; or
    a combination thereof.

10. The method of claim 1, wherein the network device comprises a location server.

11. A mobile device comprising:
    one or more Global Navigation Satellite System (GNSS) receivers;
    one or more memory; and
    one or more processors communicatively coupled to the one or more GNSS receivers and the one or more memory, and configured to:
        obtain a plurality of first satellite measurements in a first frequency, and a plurality of second satellite measurements in a second frequency;

identify, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and based on a quantity of the qualified one or more second satellite measurements exceeding a threshold number of measurements, use at least the qualified one or more second satellite measurements to determine a position of the mobile device, send at least the qualified one or more second satellite measurements to a network device, or disable usage of the first satellite measurements in the first frequency or the second satellite measurements in the second frequency, wherein the threshold number of measurements is set based at least on a characteristic of an environment associated with the mobile device.

12. The mobile device of claim 11, wherein:
the plurality of first satellite measurements in the first frequency comprise a plurality of GNSS L5 measurements; and
the plurality of second satellite measurements in the second frequency comprise a plurality of GNSS L1 measurements.

13. The mobile device of claim 11, wherein the network device is configured to determine the position of the mobile device based on the qualified one or more second satellite measurements received at the network device.

14. The mobile device of claim 11, wherein the error comprises an error between (i) the first pseudorange pre-corrected with a time bias associated with the plurality of first satellite measurements and the plurality of second satellite measurements, and (ii) the second pseudorange.

15. The mobile device of claim 11, wherein the one or more processors are further configured to identify one or more of the plurality of second satellite measurements in the second frequency as being unqualified based on: the error meeting or exceeding the error threshold, the quantity of the qualified one or more second satellite measurements not exceeding the threshold number of measurements, or a combination thereof; and
wherein the determination of the position of the mobile device comprises de-weighting or exclusion of the unqualified one or more second satellite measurements.

16. The mobile device of claim 11, wherein usage of at least the qualified one or more second satellite measurements to determine the position of the mobile device comprises determination of one or more weighted least squares values using the qualified one or more second satellite measurements.

17. The mobile device of claim 16, wherein the one or more processors are further configured to initialize a Kalman filter with the position of the mobile device using the plurality of first satellite measurements, the plurality of second satellite measurements, or a combination thereof.

18. The mobile device of claim 11, wherein disabling usage of the first satellite measurements or the second satellite measurements is based on:
a consistency between at least a pseudorange derived from the plurality of first satellite measurements and at least a pseudorange derived from the qualified one or more second satellite measurements;
a strength associated with the plurality of first satellite measurements and a strength associated with the plurality of second satellite measurements; or
a combination thereof.

19. The mobile device of claim 11, wherein disabling usage of the first satellite measurements or the second satellite measurements is based on:
a consistency between a position of the mobile device determined based on the plurality of first satellite measurements and a position of the mobile device determined based on the plurality of second satellite measurements;
a strength associated with the plurality of first satellite measurements and a strength associated with the plurality of second satellite measurements; or
a combination thereof.

20. An apparatus comprising:
means for obtaining a plurality of first satellite measurements in a first frequency, and a plurality of second satellite measurements in a second frequency;
means for identifying, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and
means for, based on a quantity of the qualified one or more second satellite measurements exceeding a threshold number of measurements, using at least the qualified one or more second satellite measurements to determine a position of the apparatus, sending at least the qualified one or more second satellite measurements to a network device, or disabling usage of the first satellite measurements in the first frequency or the second satellite measurements in the second frequency, wherein the threshold number of measurements is set based at least on a characteristic of an environment associated with the mobile device.

21. The apparatus of claim 20, wherein:
the plurality of first satellite measurements in the first frequency comprise a plurality of Global Navigation Satellite System (GNSS) L5 measurements; and
the plurality of second satellite measurements in the second frequency comprise a plurality of GNSS L1 measurements.

22. The apparatus of claim 20, wherein the network device is configured to determine the position of the apparatus based on the qualified one or more second satellite measurements received at the network device.

23. The apparatus of claim 20, wherein:
the error comprises an error between (i) the first pseudorange pre-corrected with a time bias associated with the plurality of first satellite measurements and the plurality of second satellite measurements, and (ii) the second pseudorange.

24. The apparatus of claim 20, wherein disabling usage of the first satellite measurements or the second satellite measurements is based on:
a consistency between at least a pseudorange derived from the plurality of first satellite measurements and at least a pseudorange derived from the qualified one or more second satellite measurements;
a strength associated with the plurality of first satellite measurements and a strength associated with the plurality of second satellite measurements; or
a combination thereof.

25. The apparatus of claim 20, wherein disabling usage of the first satellite measurements or the second satellite measurements is based on:
- a consistency between a position of the apparatus determined based on the plurality of first satellite measurements and a position of the apparatus determined based on the plurality of second satellite measurements;
- a strength associated with the plurality of first satellite measurements and a strength associated with the plurality of second satellite measurements; or
- a combination thereof.

26. A non-transitory computer-readable apparatus comprising a storage medium, the storage medium comprising a plurality of instructions configured to, when executed by one or more processors, cause a mobile device to:
- obtain a plurality of first satellite measurements in a first frequency, and a plurality of second satellite measurements in a second frequency;
- identify, based on an error not meeting or exceeding an error threshold, one or more of the plurality of second satellite measurements in the second frequency as qualified, the error being associated with (i) a first pseudorange determined based on the plurality of first satellite measurements and (ii) a second pseudorange determined based on the plurality of second satellite measurements; and
- based on a quantity of the qualified one or more second satellite measurements exceeding a threshold number of measurements, use at least the qualified one or more second satellite measurements to determine a position of the mobile device, send at least the qualified one or more second satellite measurements to a network device, or disable usage of the first satellite measurements in the first frequency or the second satellite measurements in the second frequency, wherein the threshold number of measurements is set based at least on a characteristic of an environment associated with the mobile device.

27. The non-transitory computer-readable apparatus of claim 26, wherein:
- the error comprises an error between (i) the first pseudorange pre-corrected with a time bias associated with the plurality of first satellite measurements and the plurality of second satellite measurements, and (ii) the second pseudorange; and
- the threshold number of measurements is set based at least on a characteristic of an environment associated with the mobile device.

28. The non-transitory computer-readable apparatus of claim 26, wherein disabling usage of the first satellite measurements or the second satellite measurements is based on:
- a consistency between at least a pseudorange derived from the plurality of first satellite measurements and at least a pseudorange derived from the qualified one or more second satellite measurements;
- a strength associated with the plurality of first satellite measurements and a strength associated with the plurality of second satellite measurements; or
- a combination thereof.

* * * * *